(12) United States Patent
Yokoyama et al.

(10) Patent No.: US 6,918,955 B2
(45) Date of Patent: Jul. 19, 2005

(54) INK-JET RECORDING LIQUID AND PROCESS FOR PRODUCING THE SAME

(75) Inventors: Masanobu Yokoyama, Yokohama (JP); Hisao Takeuchi, Yokohama (JP); Hideaki Tanaka, Yokohama (JP); Kazuhiro Maruyama, Kawasaki (JP); Katsuhito Kanazawa, Kawasaki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/873,308

(22) Filed: Jun. 23, 2004

(65) Prior Publication Data

US 2005/0022695 A1 Feb. 3, 2005

Related U.S. Application Data

(63) Continuation of application No. PCT/JP02/13845, filed on Dec. 27, 2002.

(30) Foreign Application Priority Data

Dec. 27, 2001 (JP) .......................................... 2001-397011
Apr. 30, 2002 (JP) .......................................... 2002-128454

(51) Int. Cl.$^7$ .......................... C09D 11/00; C09D 11/02
(52) U.S. Cl. ............................... 106/31.28; 106/31.65; 106/31.6; 106/31.8; 106/31.81; 106/31.77
(58) Field of Search ........................... 106/31.28, 31.65, 106/31.6, 31.8, 31.81, 31.77

(56) References Cited

U.S. PATENT DOCUMENTS 6,514,328 B1 * 2/2003 Katoh et al. ............. 106/31.28
6,565,950 B1 * 5/2003 Tomioka et al. ......... 428/32.34

FOREIGN PATENT DOCUMENTS

| JP | 56-155260 | 12/1981 |
| JP | 56-155262 | 12/1981 |
| JP | 5-148441 | 6/1993 |
| JP | 5-247391 | 9/1993 |
| JP | 8-218014 | 8/1996 |
| JP | 8-218019 | 8/1996 |
| JP | 9-151344 | 6/1997 |
| JP | 10-298476 A | 11/1998 |
| JP | 11-293164 A | 10/1999 |
| JP | 2000-273383 A | 10/2000 |
| JP | 2000-303014 | 10/2000 |
| WO | WO 99/61534 | 12/1999 |

OTHER PUBLICATIONS

English Machine Translation of JP 11–293164 Oct. 1999.*

* cited by examiner

Primary Examiner—J. A. Lorengo
Assistant Examiner—Veronica F. Faison
(74) Attorney, Agent, or Firm—Oblon, Spivak, McClelland, Maier & Neustadt, P.C.

(57) ABSTRACT

An ink-jet recording liquid using a dye and a pigment, which is excellent in dispersibility and has good printing performance and storage stability, and a process for producing the same are provided.

There are provided an ink-jet recording liquid containing a pigment, a dye and a surfactant which are incorporated in an aqueous medium, characterized in that (1) the pigment and the dye at least partly comprise a pigment and a dye reversibly adsorbed thereon without involving a chemical reaction, (2) the dye reversibly adsorbed on the pigment without involving a chemical reaction contains a dye having a dye adsorption shown by the following formula (1) of 0.02 g/g or more, and (3) as the surfactant, a nonionic surfactant and an anionic surfactant coexist; and a process for producing the same.

22 Claims, No Drawings

INK-JET RECORDING LIQUID AND PROCESS FOR PRODUCING THE SAME

TECHNICAL FIELD

The present invention relates to an ink-jet recording liquid which is suitably used in ink-jet recording and a process for producing the same. More particularly, the present invention relates to an ink-jet recording liquid which has excellent dispersibility, and good printing performance and storage stability, and to a process for producing the same.

BACKGROUND ART

As the inks for use in ink-jet printing, conventionally, inks the main components of which are a water-soluble dye and a liquid medium were the leading one. However recorded materials thereby do not have, for instance, sufficient water resistance, light resistance, and ozone resistance, due to the characteristics of the water-soluble dye used therein, so that there has been developed an ink in which a pigment is dispersed instead of the water-soluble dye in the water-soluble medium.

However, in such a pigment ink, a dispersant and a dispersion resin are generally often used in order to disperse the pigment in the ink. A most widely used polymeric dispersant inherently has a problem concerning the lowering of the storage stability of the ink that when the amount added is excessive, printing becomes impossible in a recording method such as ink-jet printing due to the elevation of the viscosity of the ink, while when the amount added is insufficient, the dispersibility of the pigment is lowered so that the coagulation and precipitation of the pigment takes place. Therefore, an improvement on an ink-jet recording liquid is desired that can facilitate the handling thereof.

For such improvement, there are known the following pigments and dyes for use in a recording liquid in which a pigment and a dye are used in combination: (1) a pigment and a dye which are chemically adsorbed by allowing the dye and a functional group on the surface of the pigment to react (refer to Patent Document 1), or (2) a pigment and a dye which are physically adsorbed (refer to Patent Documents 2, 3, 4, 5 and 6).

Of the above, in the former (1), the kind of the dye to be adsorbed is limited in accordance with the kind of the functional group of the pigment to be used, so that the combination of the dye and the pigment is limited and therefore, many limitations are to be confronted with in practical use thereof.

For example, from the viewpoint of the chemical reaction therebetween, when the pigment has a basic functional group on the surface thereof, it is necessary to combine a dye having an acidic group with the pigment, while when the pigment has an acidic functional group on the surface thereof, it is necessary to combine a dye having a basic group with the pigment. However, an aqueous recording liquid for ink-jet printing is usually a basic medium, so that a dye having an acidic group is selected when the dispersibility thereof in the medium is taken into account. Therefore, there occurs a problem that pigments having generally acidic functional groups such as a carboxylic group and a sulfonic acid group, cannot be used. Furthermore, in this method, when the chemical adsorption has proceeded 100%, the effect of dispersion stability is exhibited only by the functional groups which remain in the dye. However, in order to obtain practically usable dispersion stability only by the functional groups remaining in the dye, the density of the functional groups present on the surface of the pigment on which the dye is to be adsorbed is required to be above a certain level. However, in this case, it may occur that such adsorption does not proceed 100%, for instance, due to a steric hindrance between the dyes themselves, resulting in that the functional groups derived from the pigment and the functional group derived from the dye, which are different in polarity, coexist on the surface of the dispersion particles. Such a state may cause dispersion instability of each particle and particle association and cannot be said to be a most appropriate one for the dispersoid for use in an ink-jet ink, which is required to have storage stability for a long period of time.

In the latter (2), for the improvement on the water resistance and light resistance of a dye, and also on the chroma of a pigment because of the poor water resistance and light resistance thereof, and the insufficient chroma thereof, there are known an aqueous recording liquid comprising a pigment, a water-soluble dye and a high polymer dispersant with a molecular weight of from 1000 to 100000 used in combination (refer to, for example, Patent Document 2), a recording liquid comprising a dye having a sulfonic acid group or a sulfonate group, a liquid medium, a polymeric material which is soluble in the liquid medium, and a pigment (refer to, for example, Patent Document 3), and an ink-jet recording liquid containing a dye, a pigment, a water-soluble surfactant and water (refer to, for example, Patent Document 4).

However, the dispersions containing a pigment and a dye, disclosed in these prior art references, are prepared by mixing a pigment and a dye together with a polymeric dispersant or a polymeric material, or by mixing a dye with a dispersion of a pigment which has been dispersed in advance by use of a surfactant. In such preparation methods, there are merely obtained a dispersing effect which is attained by the dispersant such as a polymeric dispersant and a surfactant being adsorbed onto a pigment, and a color tone enhancement effect which is attained by the coexistence of a water-soluble dye. Therefore, these references neither recognize nor suggest the state of the absorption of the dye on the pigment, the control thereof, and the technical effects obtained thereby.

Furthermore, in the case of a pigment dispersion prepared by simply mixing a pigment, a dye and a polymeric dispersant or a polymeric material, a composite material composed of the pigment and the polymeric dispersant or the polymeric material, and a composite material composed of the dye and the polymeric dispersant or the polymeric material are simultaneously formed, thereby producing heterogeneity in the system. There is concern that such heterogeneity will cause problems in the physical properties in solution of a dispersion and a recording liquid, in particular, in the reproducibility and changes in the viscosity characteristics thereof with time.

In addition, as the polymeric dispersant disclosed in the above-mentioned Patent Document 2, there is used a dispersant with a weight average molecular weight of as high as 20000, so that the problems as caused in the system when the above-mentioned polymeric dispersant is used cannot be solved.

Furthermore, of the latter (2), there is proposed a recording liquid in which a dye is used as a dispersant for a pigment, instead of a surfactant or a polymer which is conventionally used for dispersing a pigment (refer to Patent Documents 5 and 6). However, when a recording liquid is prepared by use of a pigment dispersion in which only a dye is used as a dispersant, this preparation method has large limitations on an organic solvent and an additive to be used in the recording liquid since the dispersion stability of the pigment is largely lowered, depending upon an organic solvent and an additive used, so that there is a problem in practical use.

In particular, in the method disclosed in Patent Document 6, only a dye which has the same basic skeleton as that of a pigment is used, and a step of removing an unabsorbed dye from a dispersoid of the pigment and the dye by ultrafiltration or centrifugation is indispensable, so that from the viewpoints of the freedom of the selection of color tone, complexities, cost and others thereof, the method has problems in practical use.

| Patent Document 1 | JP-A-9-151344 |
| Patent Document 2 | JP-B-60-45667 |
| Patent Document 3 | JP-A-5-247391 |
| Patent Document 4 | JP-A-8-218019 |
| Patent Document 5 | W/O 99/61534 |
| Patent Document 6 | JP-A-2000-273383 |

DISCLOSURE OF THE INVENTION

The inventors of the present invention have discovered, as a result of their extensive studies in view of such circumstances, that an ink-jet recording liquid with excellent dispersibility and excellent printing performance and storage stability can be obtained by selecting a combination of a pigment and a dye with a particular physical adsorptivity to the pigment, and using a combination of a nonionic surfactant and an anionic surfactant therewith. Such a recording liquid can be easily obtained by taking a particular dispersing process comprising the steps of dispersing a pigment and a dye in an aqueous medium in advance, and then subjecting the dispersion to a secondary dispersing process in the presence of a surfactant. In this process, the dye is adsorbed on the surface of the pigment in a stable manner, thereby obtaining a pigment dispersing effect by the dye, and part of the adsorbed dye is partly replaced by a particular surfactant which is suitable for the liquid properties of the recording liquid, whereby a secondary aggregation of a dispersoid in a recording liquid can be suppressed and a recording liquid with excellent stability of dispersibility and others can be made. The present invention has been made based on such knowledge.

An aspect of the present invention is an ink-jet recording liquid comprising an aqueous medium, and a pigment, a dye and a surfactant which are incorporated in the aqueous medium, characterized in that (1) the pigment and the dye at least partly comprise a pigment and a dye reversibly adsorbed thereon without involving a chemical reaction, that (2) the dye reversibly adsorbed on the pigment without involving any chemical reaction comprises a dye with a dye absorption of 0.02 g/g or more shown by the following formula (I):

$$\text{Dye adsorption (g/g)} = \frac{\text{Dye absorption ratio of the dispersion} \times \text{Total amount of the dye in the dispersion } (=0.4 \text{ g})}{\text{Amount of the pigment in the dispersion } (=4.1 \text{ g})} \quad (1)$$

(wherein the dye absorption ratio is a value obtained by preparing a dispersion by use of the pigment (4.1 g) and the dye (0.4 g) in the absence of the surfactant, obtaining a supernatant liquid with the elimination of solid components from the dispersion, measuring the concentration of the dye in each of the supernatant liquid and an aqueous solution of the dye (0.4 g) by use of high performance liquid chromatography, and determining the ratio of the peak areas obtained), and that (3) a nonionic surfactant and an anionic surfactant coexist as the surfactant.

Another aspect of the present invention is a process for producing an ink-jet recording liquid comprising a pigment on which a dye is reversibly adsorbed without involving a chemical reaction, and a nonionic surfactant and an anionic surfactant which coexist as surfactants, characterized in that a pigment, a dye and/or an aqueous medium solution of a dye, and an aqueous medium are mixed to subject the pigment and the dye to a primary dispersing process to obtain a dispersion, and a nonionic surfactant and an anionic surfactant, and/or an aqueous medium solution of these surfactants are added to the dispersion to subject the same to a secondary dispersing process.

BEST MODE FOR CARRYING OUT THE INVENTION

The present invention will be explained in further detail as follows.

The ink-jet recording liquid of the present invention comprises an aqueous medium, and a pigment, a dye and a surfactant which are incorporated in the aqueous medium, characterized in that (1) the pigment and the dye at least partly comprise a pigment and a dye reversibly adsorbed thereon without involving a chemical reaction, that (2) the dye reversibly adsorbed on the pigment without involving any chemical reaction comprises a dye with a dye absorption of 0.02 g/g or more shown by the following formula (I)

$$\text{Dye adsorption (g/g)} = \frac{\text{Dye absorption ratio of the dispersion} \times \text{Total amount of the dye in the dispersion } (=0.4 \text{ g})}{\text{Amount of the pigment in the dispersion } (=4.1 \text{ g})} \quad (1)$$

(the dye absorption ratio is defined as mentioned above), (3) a nonionic surfactant and an anionic surfactant coexist as the surfactant.

The above-mentioned feature (1) that the dye is reversibly adsorbed on the pigment without involving a chemical reaction means that the dye is not irreversibly adsorbed on the pigment by a chemical reaction such as a covalent bond, but is reversibly adsorbed on the pigment, for instance, by physical adsorption or hydrogen bonding, so that it is required that the combination of the pigment and the dye be selected so as to produce such an adsorbed state.

The reversible adsorption of the dye on the pigment without involving a chemical reaction can be confirmed, for example, as follows. Specifically, to a prepared recording liquid is added an excessive amount of dimethylformamide (DMF) (for example, about 9 times by weight), and the mixture is sufficiently mixed by ultrasonic dispersing process or the like, and the pigment is removed from the mixture by filtering or the like, so that the amount of the dye in the filtrate is determined. The amount of the dye which is not adsorbed onto the pigment in the recording liquid at the time of the preparation of the recording liquid is confirmed in advance, and an increase in the amount of the dye contained in the recording liquid after the processing is confirmed, whereby it can be confirmed that the dye is reversibly adsorbed onto the pigment.

The recording liquid of the present invention may contain, other than the pigment which reversibly adsorbs the dye without involving any chemical reaction, for instance, a pigment to which a self-dispersion performance has been imparted by surface treatment or the like, so long as the dye has no adverse effects on the performance of the recording liquid. The content of the pigment is usually 30 wt % or less, preferably 20 wt % or less, more preferably 10 wt % or less, furthermore preferably 5 wt % or less, particularly preferably 1 wt % or less, to the total amount of the pigments.

The above-mentioned feature (2) indicates that it is good to selectively use a dye having high adsorptivity onto the pigment as the dye to be adsorbed on the pigment, and that the dye is characterized in that the adsorption of the dye onto the pigment (hereinafter referred to as the "dye adsorption") represented by the formula (I) is 0.02 g/g or more. The "dye adsorption ratio" in the formula (I) is such a value that can be determined by the following method.

Dye Adsorption Ratio:

At 23° C., water is added to the pigment in an amount of 4.1 g in terms of solid content and the dye in an amount of 0.4 g in terms of solid content, to make the total amount thereof 50 g. The mixture is subjected to dispersing process together with 75 g of 0.5 mm$\phi$ zirconia beads in a paint shaker for 6 hours to obtain a dispersion. This dispersion is subjected to centrifugation at a centrifugal force of 17968×g (g is gravitational acceleration) at 23° C. for 3 hours, whereby a supernatant liquid is obtained.

A 0.87 wt % dye aqueous solution (that is, a dye aqueous solution with a concentration (0.4/45.9×100=0.87 wt %) of the dye (0.4 g) in water (45.5 g) and the dye (0.4 g)) is obtained, which corresponds to the case where all the pigment in the dispersion has been subjected to centrifugal sedimentation and no dye is adsorbed on the pigment.

The above-mentioned supernatant liquid and the above-mentioned 0.87 wt % dye aqueous solution are subjected to High Performance Liquid Chromatography to obtain each HPLC peak area derived from the dye, so that the dye adsorption ratio is obtained from the following formula (II), based on the obtained HPLC peak areas derived from the dye.

$$\text{Dye adsorption ratio} = 1 - \frac{HPLC \text{ peak area of supernatant liquid}}{HPLC \text{ peak area of } 0.87 \text{ wt \% dye aqueous solution}} \quad (II)$$

Measurement Conditions for HPLC:

| | |
|---|---|
| Detection wavelength | 254 nm |
| Column temperature | 40° C. |
| Eluate | acetonitrile water (the concentration of acetonitrile is so adjusted that a main peak can be detected within a 60-minute measurement time) |
| Buffer | tetrabutylammonium bromide; 1.0 wt %/$H_2O$ sodium dihydrogenphosphate; 0.25 wt %/$H_2O$ |
| Flow rate | 1.0 ml/min |
| Injection amount | 2.0 $\mu l$ (undiluted) |

In this measurement, there is no particular limitation on the column as long as it is capable of detecting water-soluble dyes. However, a column with a reverse phase separation mode, which is in general use, is preferable. Furthermore, there is no particular limitation on a chromato pack as long as it is capable of performing data processing from the HPLC detector.

Furthermore, in the recording liquid of the present invention, two or more kinds of pigments and/or two or more kinds of dyes may be used in combination. When a mixed-dye type recording liquid is made, the dye in the dispersion is made a mixture of dyes with a mixing ratio corresponding to the mixing ratio of the dyes in the recording liquid. Likewise, when a mixed-pigment type recording liquid is made, the pigment in the dispersion is made a mixture of pigments. When a mixed-dye and mixed-pigment type recording liquid is made, the dye and the pigment in the dispersion are respectively a mixture of dyes with a mixing ratio corresponding to that of the dyes in the recording liquid, and a mixture of pigments with a mixing ratio corresponding to that of the pigments in the recording liquid. In the case of the mixed-dye type recording liquid, the dye in the 0.87 wt % dye aqueous solution in the formula (II) is a mixture of dyes with a mixing ratio corresponding to the mixing ratio of the dyes in the recording liquid.

In the recording liquid of the present invention, there is employed a dye with the dye adsorption(g/g) represented by the above-mentioned formula (I) being usually 0.02 g/g or more, preferably 0.03 g/g or more, more preferably 0.04 g/g or more. When the adsorption is less than 0.02 g/g, the effect of dispersing the pigment is difficult to obtain, or a sufficient dispersion stability becomes difficult to obtain. The greater the dye adsorption on the pigment, the more preferable. However, theoretically, there is an upper limit to the dye adsorption, so that when the amount of the dye is increased with the amount of the pigment kept constant, the dye adsorption becomes constant when the amount of the added dye reaches a predetermined amount (this adsorption is hereinafter referred to as "saturated adsorption"). Therefore, the upper limit of the dye adsorption is provided by such a saturated adsorption.

The saturated adsorption depends upon the kinds of the pigment and the dye to be used, so that a specific value cannot be given unconditionally, but the saturated adsorption is generally about 0.01 to 0.1 g/g.

In the recording liquid of the present invention, a dye with an adsorption on the pigment being less than 0.02 g/g may be partly used as long as the dye does not have an adverse effect on the performance of the recording liquid. The amount of such a dye is generally 30 wt % or less, preferably 20 wt % or less, more preferably 10 wt % or less, furthermore preferably 5 wt % or less, particularly preferably 1 wt % or less.

The above-mentioned feature (3) that a nonionic surfactant and an anionic surfactant are caused to coexist can be realized by use of a nonionic surfactant and an anionic surfactant in combination as the surfactant, with the components of the recording liquid such as the pigment, the dye, various additives, an aqueous organic medium and others taken into account.

(Pigment)

As the pigment for use in the present invention, it is preferable to selectively use a pigment having an aromatic ring type skeleton, not including functional groups having high reactivity with a functional group of a dye molecule, or including such functional groups as few as possible, which will be described later. When the pigment has many reactive functional groups, adsorption involving a chemical reaction with a functional group of the dye is apt to occur, so that a secondary agglomeration of the pigment is apt to occur, which is caused by a hydrophobic portion of the adsorbed dye, or by unreacted functional groups, and the particle diameter of the dispersion is increased. As a result, the storage stability of the recording liquid is apt to be lowered.

Furthermore, as mentioned above, when the dye is chemically adsorbed on the surface of the pigment through a chemical reaction of the dye with a functional group of the pigment, the dye cannot be appropriately replaced by a surfactant when subjected to dispersing process by the surfactant, so that the dispersion stability is maintained by electrostatic repulsion only. In a recording liquid containing an organic solvent, there is no steric repulsion, so that the storage stability is apt to become poor and therefore such a chemical adsorption is not preferable.

Furthermore, it is preferable that the skeleton structure of the dye molecule which will be described later be similar to the skeleton structure of the pigment molecule, because much of the dye can be adsorbed on the surface of the pigment in a stable manner.

As the above-mentioned pigment, preferable pigments are, for example, quinacridone pigments, xanthene pigments, perylene pigments, anthanthrone pigments, monoazo pigments, disazo pigments, phthalocyanine pigments, isoindolinone pigments, anthraquinone pigments and quinophthalone pigments. Of these pigments, quinacridone pigments, monoazo pigments, disazo pigments or phthalocyanine pigments are preferable.

Of the above-mentioned pigments, specific examples of preferable red pigments are quinacridone pigments such as C.I. Pigment Red-122, -202, -206, -207 and -209, and C.I. Pigment Violet-19; xanthene pigments such as C.I. Pigment Red-81 and -173; perylene pigments such as C.I. Pigment Red-123; anthanthrone pigments such as C.I. Pigment Red-168; and monoazo pigments such as C.I. Pigment Red-5, -7, -12, -112, -146 and -147. The following are the structural formulae of representative quinacridone pigments, xanthene pigments, perylene pigments, anthanthrone pigments and monoazo pigments:

Quinacridone Pigments

C. I. PigmentRed122

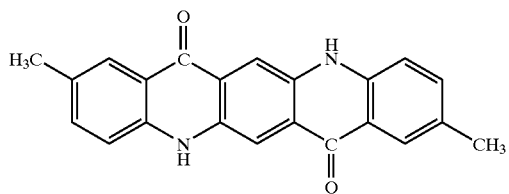

C. I. PigmentRed202

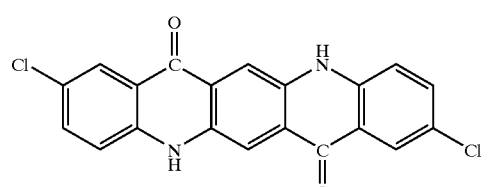

C. I. PigmentRed207

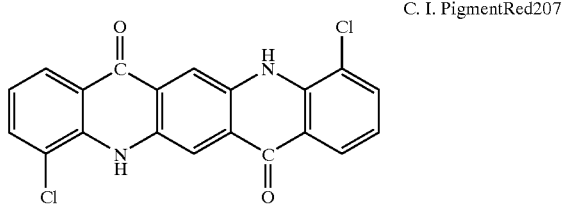

C. I. PigmentRed206

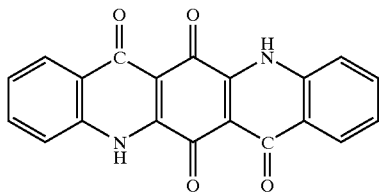

C. I. PigmentRed209

C. I. PigmentViolet19

Xanthene Pigments

C. I. PigmentRed81

(is the phosphotungstomolybdic acid salt)

C. I. PigmentRed173

(is the aluminium salt)

Perylene Pigments

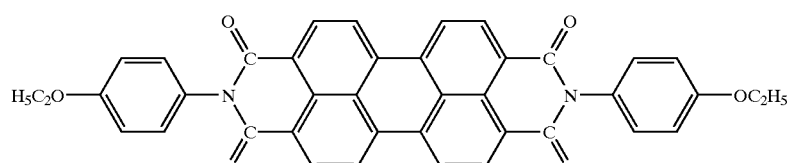

C. I. PigmentRed123

Anthanthrone Pigments

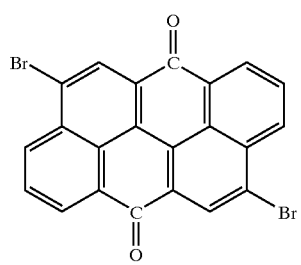

C. I. PigmentRed168

-continued

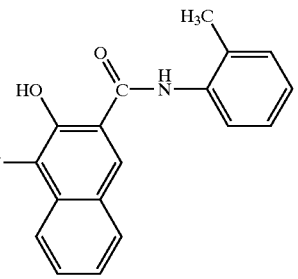

C. I. PigmentRed112

Monoazo Pigments

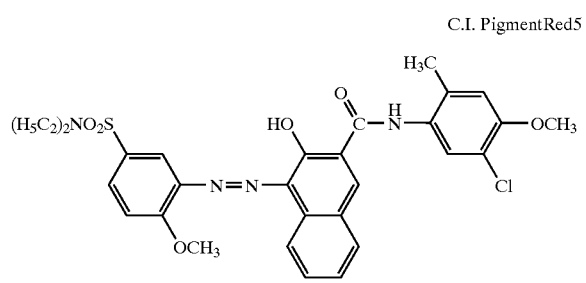

C.I. PigmentRed5

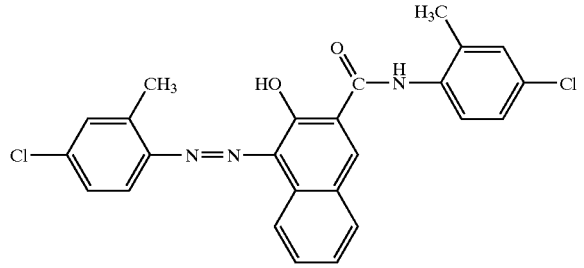

C. I. PigmentRed7

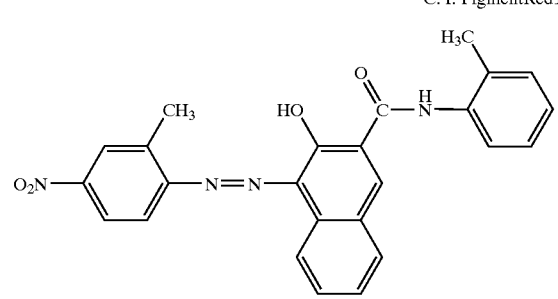

C. I. PigmentRed12

C. I. PigmentRed146

C. I. PigmentRed147

Of the above-mentioned pigments, specific examples of preferable yellow pigments are monoazo pigments such as C.I. Pigment Yellow-1, -2, -3, -10, -60, -73, -74, -75, -120, -151 and -175; disazo pigments such as C.I. Pigment Yellow-12, -13, -14, -16, -17, -81, -83, -93, -95, 126, -128, -174 and -180; isoindolinone pigments such as C.I. Pigment Yellow-109, -110, -139 and -185; anthraquinone pigments such as C.I. Pigment Yellow-23, -108 and -147; and quinophthalone pigments such as C.I. Pigment Yellow-138. The following are the structural formulae of representative monoazo pigments, disazo pigments, isoindolinone pigments, anthraquinone pigments, and quinophthalone pigments:

Monoazo Pigments
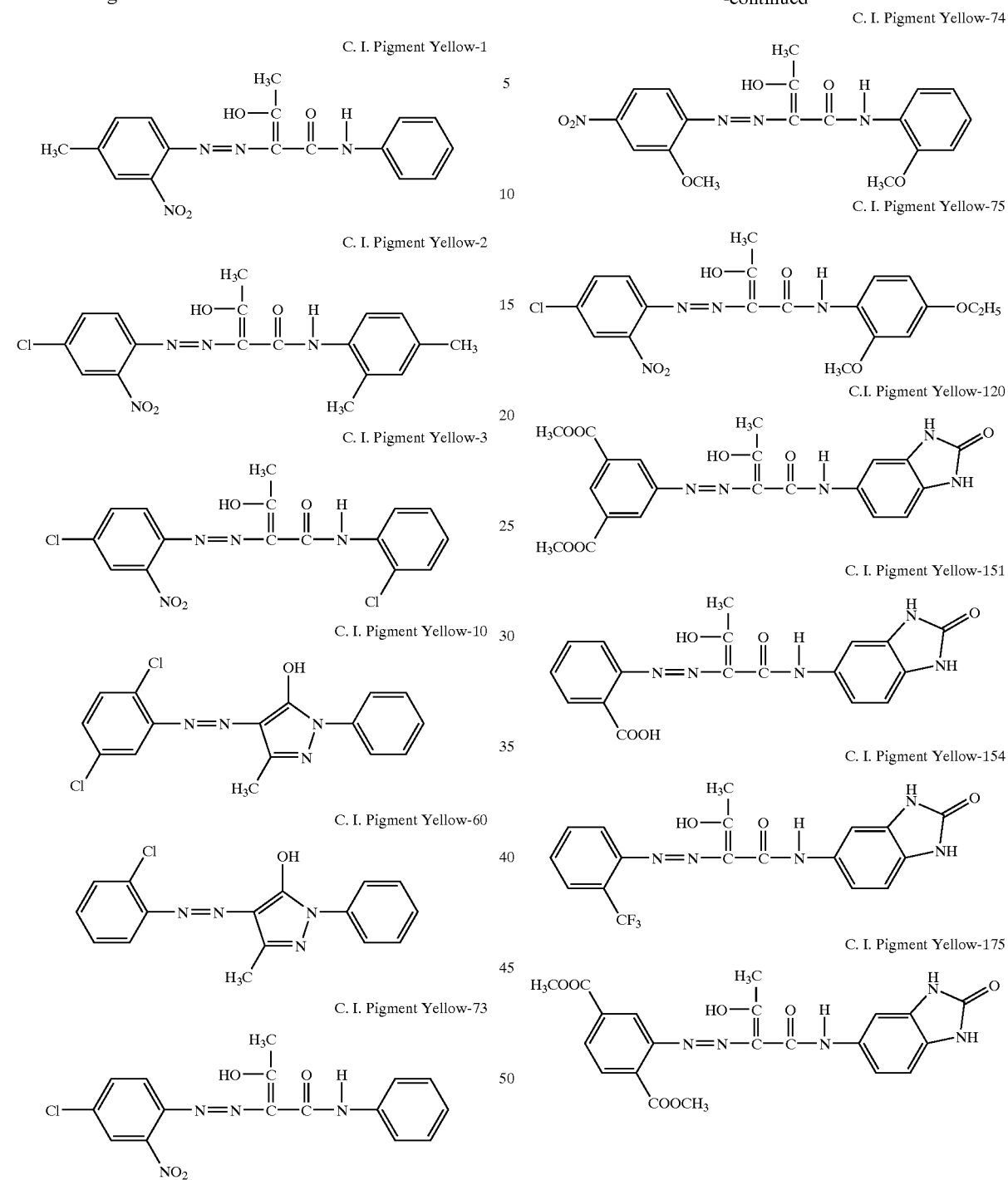
Disazo Pigments
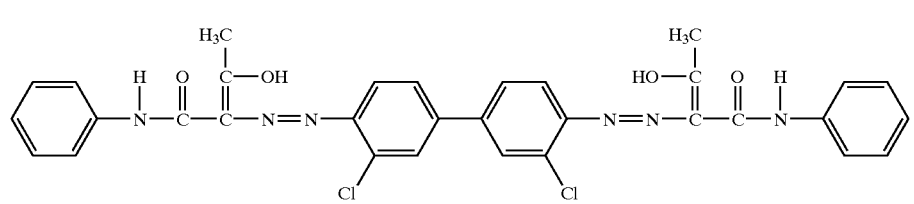

-continued
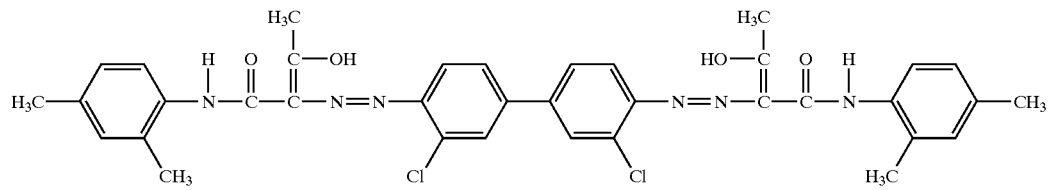
C. I. Pigment Yellow-13
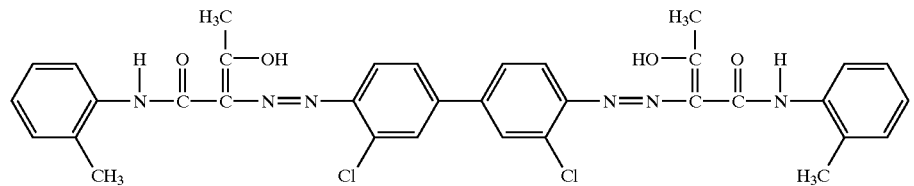
C. I. Pigment Yellow-14
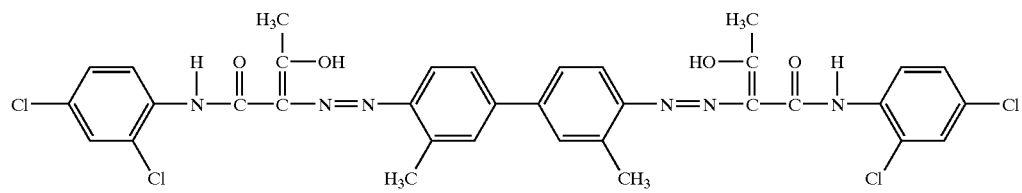
C. I. Pigment Yellow-16
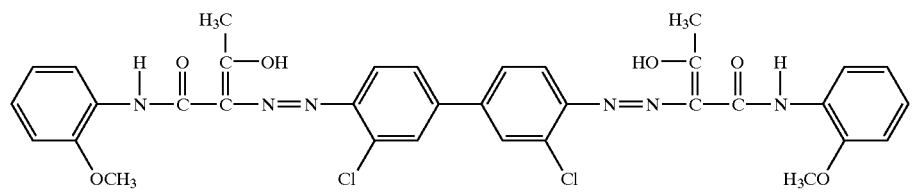
C. I. Pigment Yellow-17
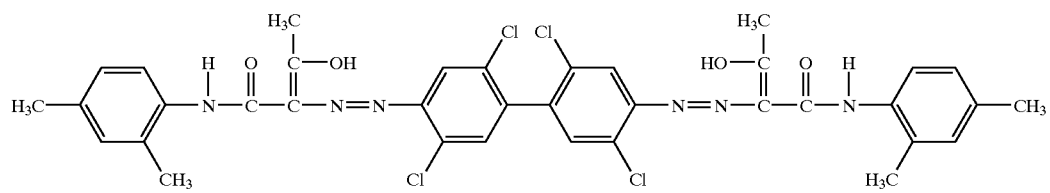
C. I. Pigment Yellow-81
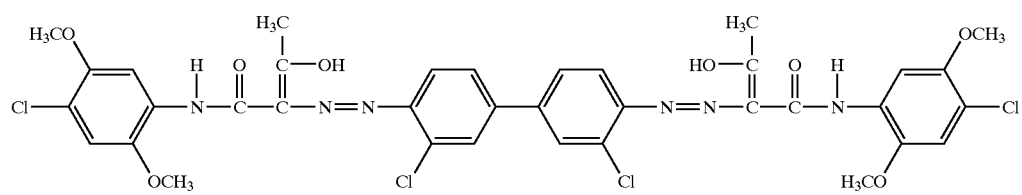
C. I. Pigment Yellow-83
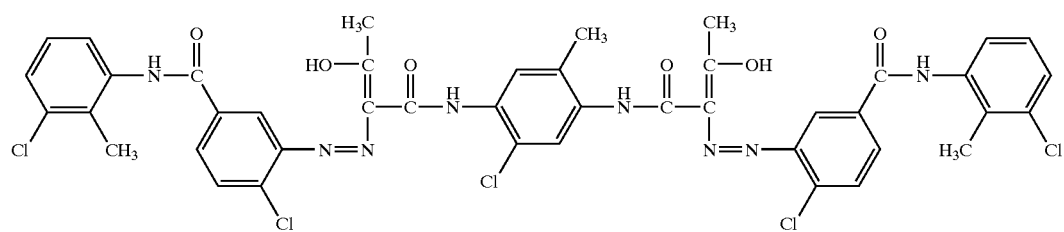
C. I. Pigment Yellow-93

C. I. Pigment Yellow-95
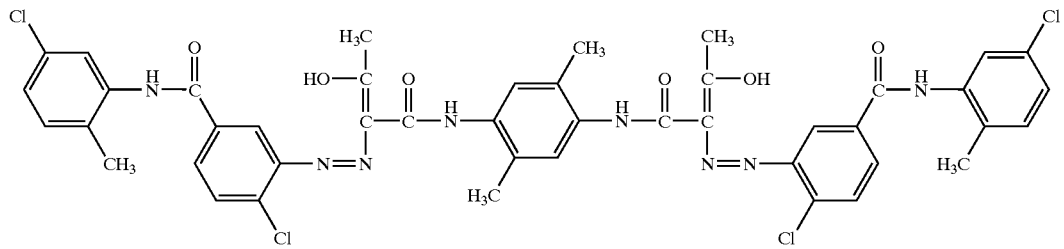
C. I. Pigment Yellow-126
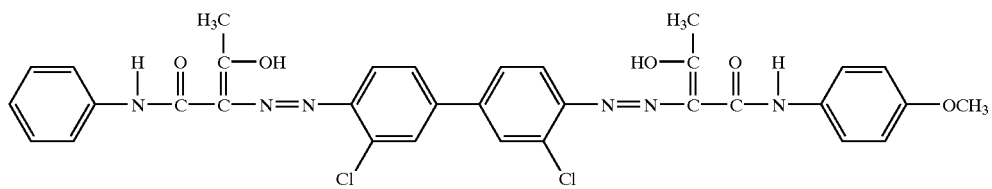
C. I. Pigment Yellow-128
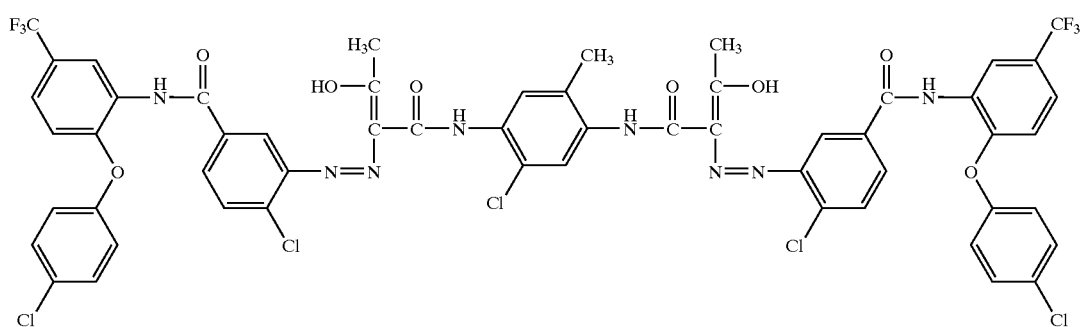
C. I. Pigment Yellow-174
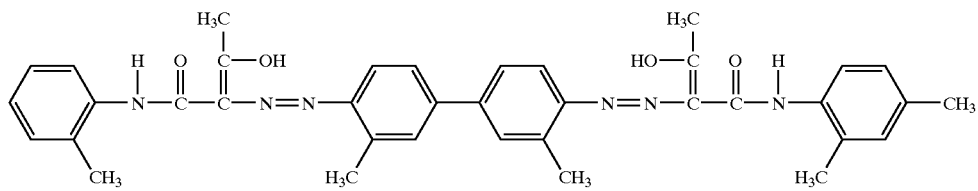
C. I. Pigment Yellow-180
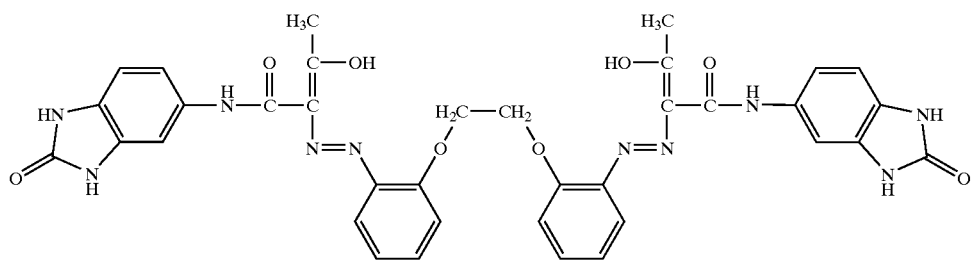
Isoidolinone Pigments
C. I. Pigment Yellow-109
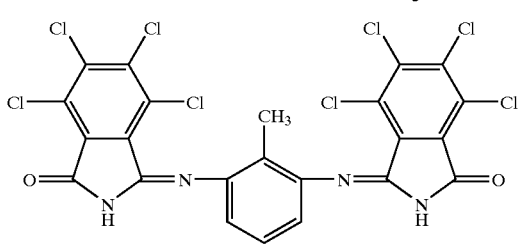
-continued
C. I. Pigment Yellow-110
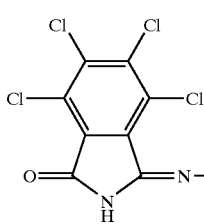

C. I. Pigment Yellow-139

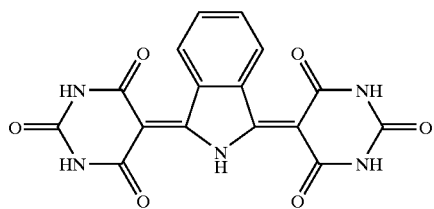

C. I. Pigment Yellow-185

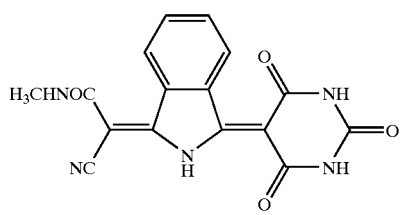

Anthraquinone Pigments

C. I. Pigment Yellow-23

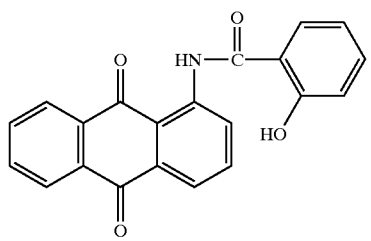

C. I. Pigment Yellow-108

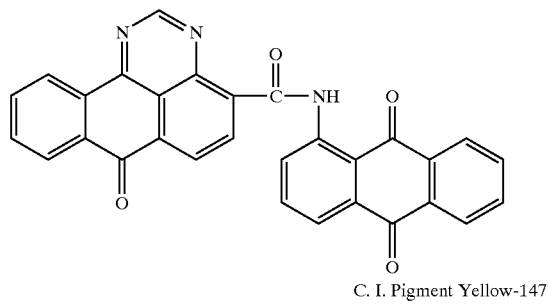

C. I. Pigment Yellow-147

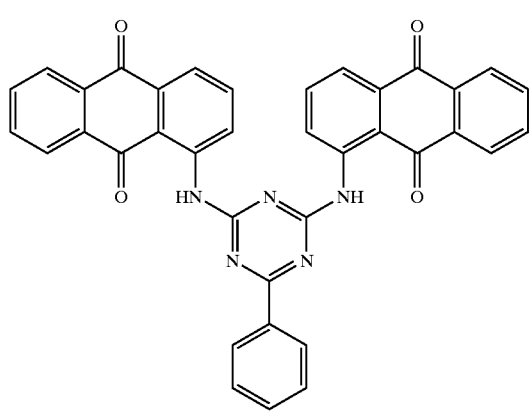

Quinophthalone Pigments

C. I. Pigment Yellow-138

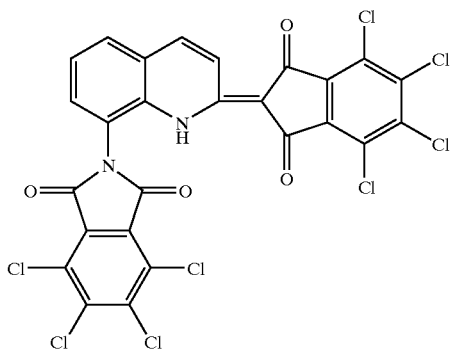

Of the above-mentioned pigments, quinacridone pigments, monoazo pigments and disazo pigments are particularly preferable, for instance, in view of their good color development to other pigments.

In particular, in view of color tone, C.I. Pigment Red-122 and -209, and C.I. Pigment Yellow-1, -3, -16, -17, -74, -120, -128, -151 and -175 are particularly preferable.

Furthermore, of the above pigments, C.I. Pigment Red-122, and C.I. Pigment Yellow-1, -74, -120, -151 and -175 are particularly preferable, since they are non-halogen compounds and have little effects on the environment.

The pigments for use in the present invention have a mean particle diameter of 500 nm or less, preferably 200 nm or less, in view of the printing performance, the color characteristics of a printed matter, and the resistance to weathering thereof. The lower limit thereof is usually 20 nm or more. When the lower limit thereof is less than that, the resistance to weathering is apt to be lowered.

There is no particular limitation on the molecular weight of the pigments. However, in view of the dispersibility and others, the molecular weight is usually 200 or more, preferably 300 or more, usually 2000 or less, preferably 1500 or less.

(Dye)

As the dye for use in the present invention, it is necessary to select such a dye that is reversibly adsorbed on the pigment with high adsorbability, at least without involving a chemical reaction, in the dispersion of the pigment for use in an ink-jet recording liquid.

As such a dye, dyes of which skeleton structure is similar to that of the pigment are particularly preferable since physical adsorption easily takes place. As the similarity of the skeleton structure, there can be given a similarity derived from a ring structure which produces a planarity in the chemical structures of the molecule of the dye and the molecule of the pigment, and a similarity derived from the mutual stacking of the π electrons in the molecule of the dye and in the molecule of the pigment, or from the electric attraction of the functional groups thereof as a combination of producing a stronger physical adsorption.

Furthermore, it is preferable that the number of dissociative groups such as hydroxyl group, amino group, carboxyl groups or the like, and sulfonic acid groups or the like be 1 or more, and 4 or less, per one molecule of the dye. Furthermore preferably, the dye is in the form of a free acid having a dissociative group which is represented at least either by —COOH or —SO$_3$H, and particularly preferably the number of such dissociative groups is one or more, and two or less per one molecule of the dye.

Unless the dye molecule has such a dissociative group, the effect of dispersing the pigment into an aqueous medium, which is to be obtained by the adsorption of the dye on the pigment, becomes difficult to obtain. On the other hand, when the dye includes three or more dissociative groups represented by —COOH or —SO$_3$H, the dye more easily dissolves in the medium of the recording liquid rather than is adsorbed on the surface of the pigment, so that the dispersion effect to be obtained by the adsorption of the dye on the pigment is difficult to obtain. Furthermore, the ink-jet recording liquid is usually neutral to alkaline in terms of the liquid property thereof, so that it is appropriate that the pigment has an anionic group to such an extent that the pigment is dissociated in an alkaline aqueous solvent and can secure an affinity for water.

As to a suitable combination of the pigment and the dye, a sweeping statement cannot be made, since the combination is selected so as to be derived from the ring structure to produce the planarity and from the electric attraction as mentioned above and does not depend only upon the similarity of a partial skeleton between the two. However, for example, when quinacridone pigments are used, xanthene dyes or anthraquinone dyes are preferably used in combination therewith because those dyes have a skeleton structure which is similar to an aromatic condensed polycyclic ring type skeleton structure suitable for physical adsorption. When azo pigments are used, azo dyes are preferably used in combination therewith. Specifically, for example, when a pigment having an acetoacetoanilide skeleton such as Pigment Yellow-74 is used, a dye having the same acetoacetoanilide skeleton is preferably used in combination therewith, since the acetoacetoanilide skeleton is a skeleton structure suitable for physical adsorption to the pigment.

In the pigment dispersion for use in the recording liquid in the present invention, the dispersion effect produced by the adsorption of the dye onto the surface of the pigment is utilized, so that the dye is not necessarily of the same color as that of the pigment, and the color of the dye may be appropriately selected so as to let the ink-jet recording liquid obtained have the desired color. In particular, in order not to give an effect to the color tone of the pigment, a dye of the same type of color as that of the pigment is used in an amount of 50 wt % or more, preferably 60 wt % or more, more preferably 70 wt % or more, furthermore preferably 80 wt % or more, particularly preferably 90 wt % or more, most preferably 95 wt % or more.

Here, as red dyes, dyes which give a red hue indicated by 5RP (red purple) to 2.5YR (yellow red) in Munsell hue ring are preferable. As yellow dyes, dyes which give a yellow hue indicated by 5YR (yellow red) to 2.5Y (yellow green) in Munsell hue ring are preferable.

Specific kinds of dyes are selected, with the pigments to be used together taken into account as mentioned above. Specific examples of preferable red dyes and yellow dyes are as follows. These dyes are such that the number of dissociative groups such as —COOH or —SO$_3$H is 2 or less in the form of a free acid per one molecule of the dye.

Red Dyes
Xanthene dyes: C.I. Acid Red-51, -87, -91, -92, -94, -95 and -98, and the like;
Anthraquinone dyes: C.I. Acid Red-80 and -83, C.I. Acid Violet-34, -39 and -43, and the like;
Monoazo dyes: C.I. Acid Red-1, -4, -8, -13, -14, -15, -26, -35 and -37, C.I. Direct Red-20 and -51, C.I. Acid Violet-7, and the like;
Disazo dyes: C.I. Acid Red-73, -C.I. Direct Red-1, -2, -8, -13, -28, -31, -33, -37, -39, -59, -81, -90 and -110, and the like;

Yellow Dyes Monoazo dyes: C.I. Acid Yellow-4, -17, -29, -36, -66 and -99, C.I. Direct Yellow-27 and -157, C.I. Food Yellow-3, C.I. Mordant Yellow-10, -18 and -57, and the like;

Disazo dyes: C.I. Acid Yellow-38, -42 and -44, C.I. Direct Yellow-4, -12 and -132, and the like;

Nitro dyes: C.I. Acid Yellow-1 and the like;

Aminoketone dyes: C.I. Acid Yellow-7, C.I. Mordant Yellow-23, and the like;

Xanthene dyes: C.I. Acid Yellow-73 and -74, and the like;

Quinoline dyes: C.I. Acid Yellow-2 and -5, and the like;

Xanthene Dyes

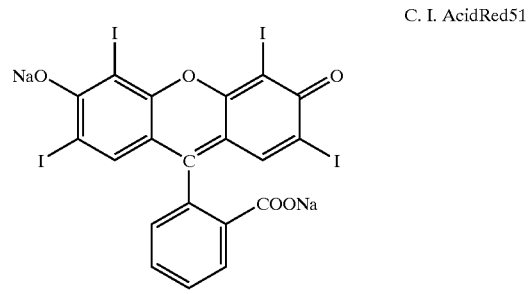

C. I. AcidRed51

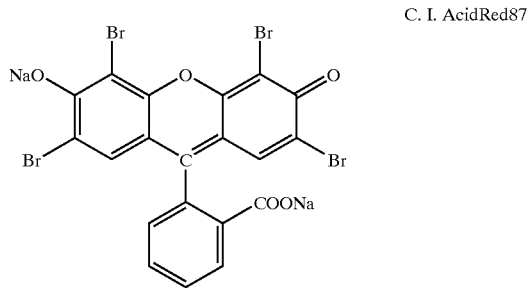

C. I. AcidRed87

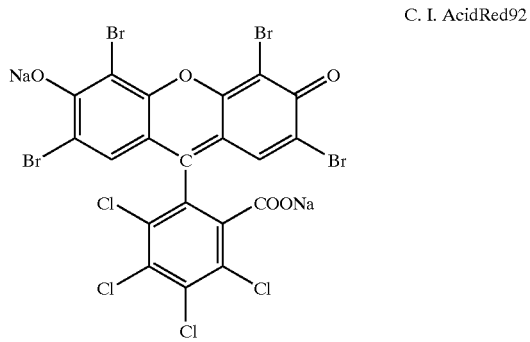

C. I. AcidRed92

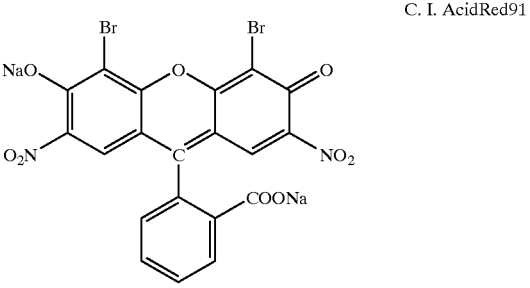

C. I. AcidRed91

C. I. AcidRed94
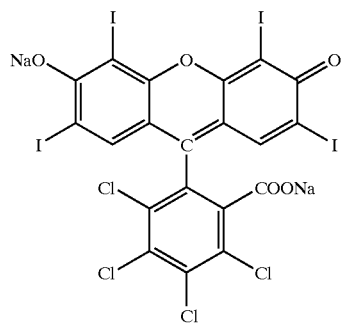
C. I. AcidRed95
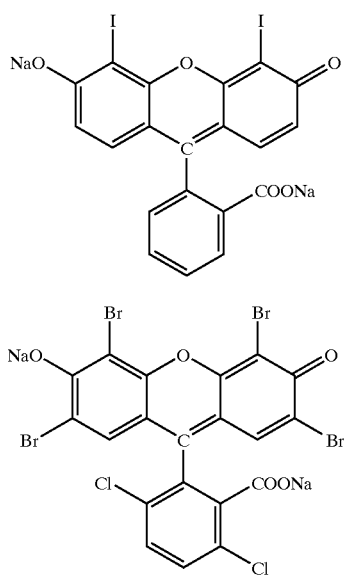
C. I. AcidRed98
Anthraquinone Dyes
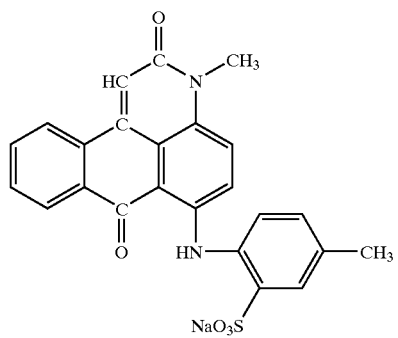
C. I. AcidRed80
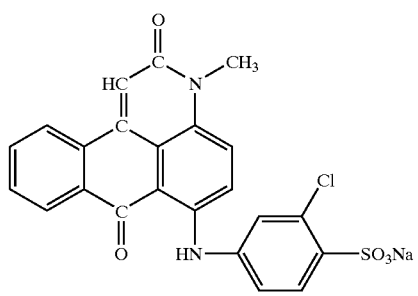
C. I. AcidRed83
C. I. AcidViolet34
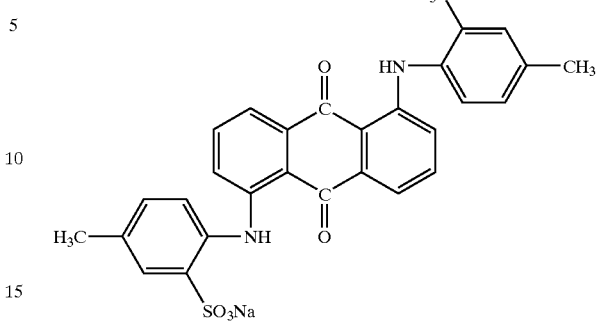
C. I. AcidViolet39
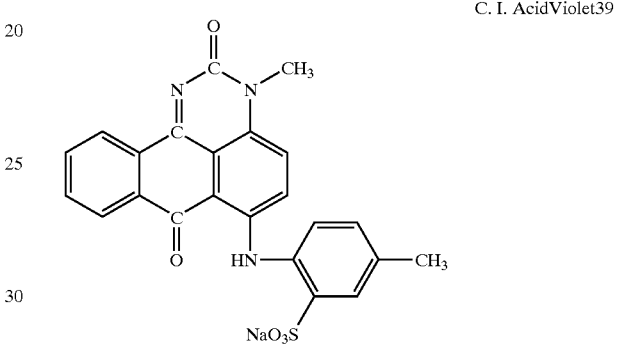
C. I. AcidViolet43
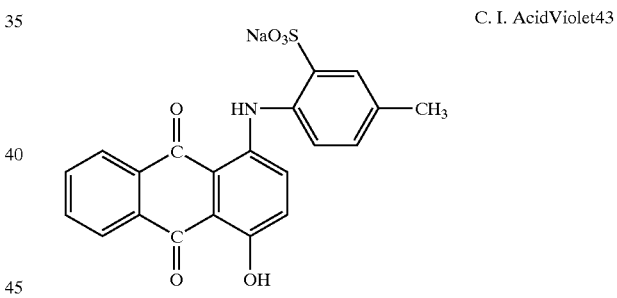
Monoazo Dyes
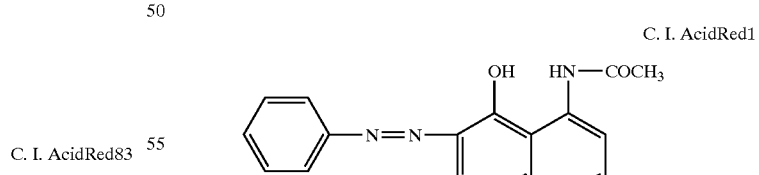
C. I. AcidRed1
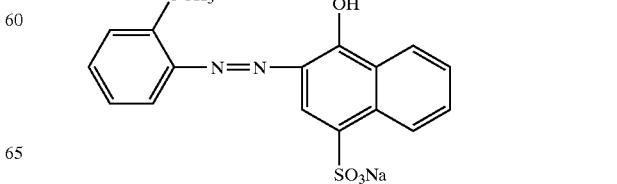
C. I. AcidRed4

C. I. AcidRed8
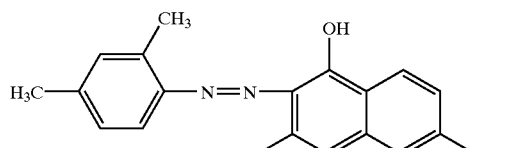
C. I. AcidRed13
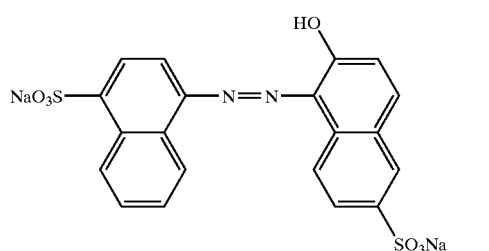
C. I. AcidRed14
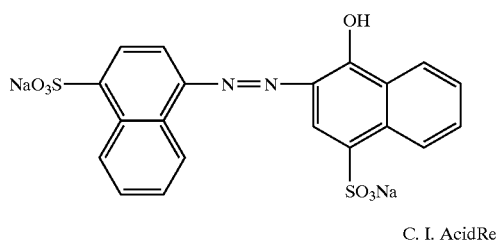
C. I. AcidRed15
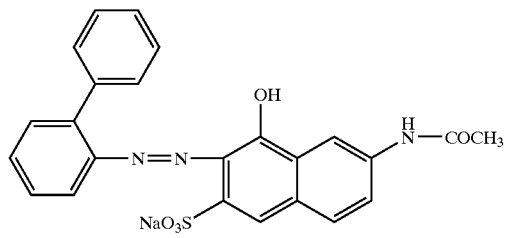
C. I. AcidRed26
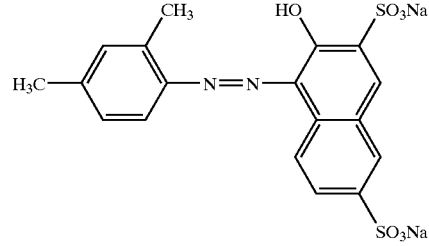
C. I. AcidRed35
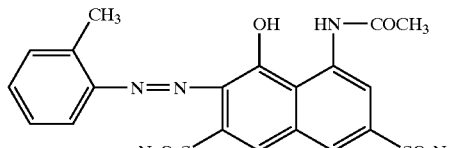
C. I. AcidRed37
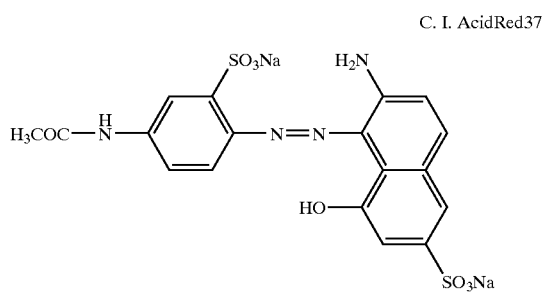
C. I. DirectRed20
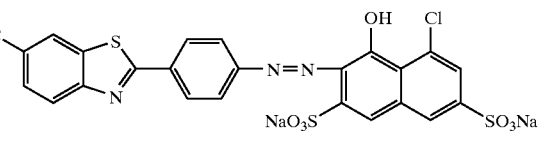
C. I. DirectRed51
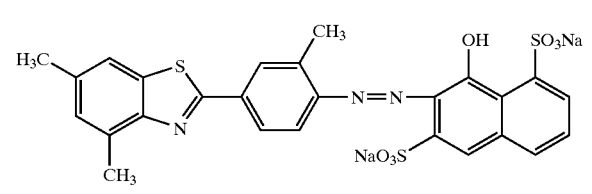
C. I. AcidViolet7
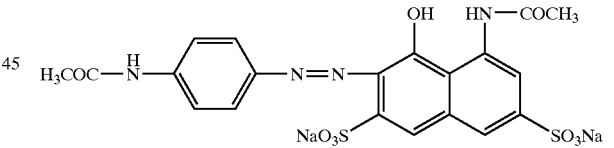
Disazo Dyes
C. I. AcidRed73
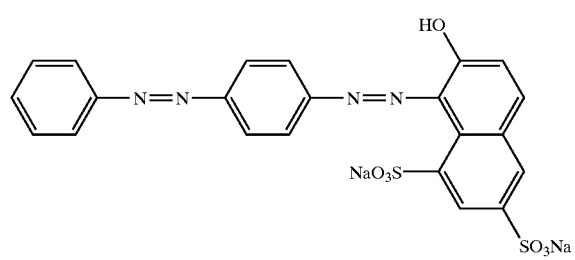

-continued
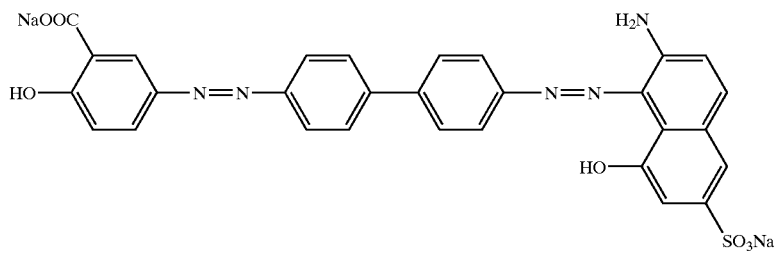
C. I. DirectRed1
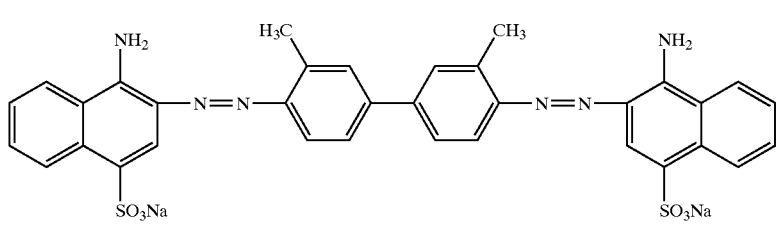
C. I. DirectRed2
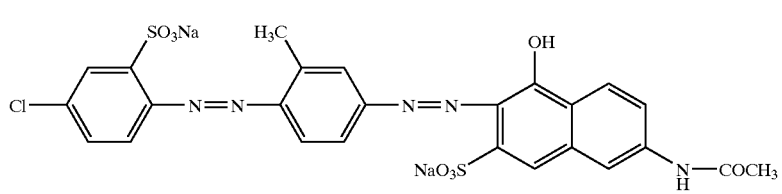
C. I. DirectRed8
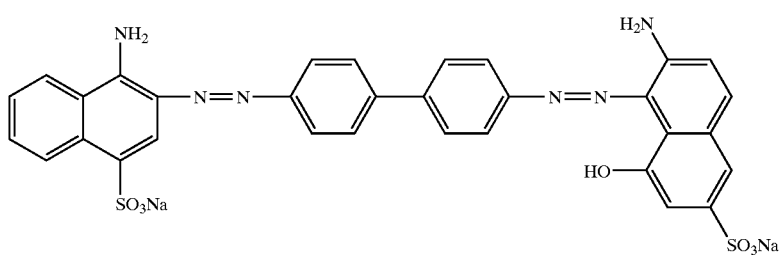
C. I. DirectRed13
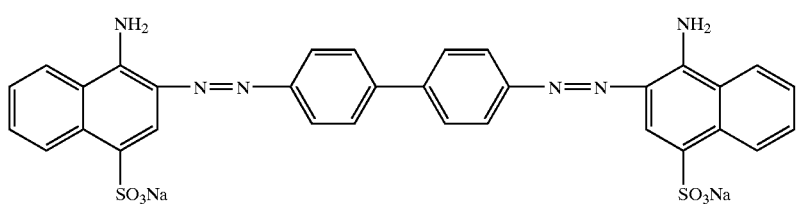
C. I. DirectRed28
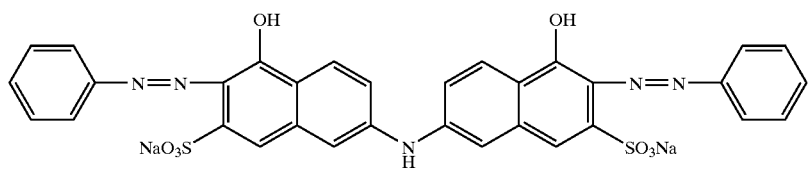
C. I. DirectRed31
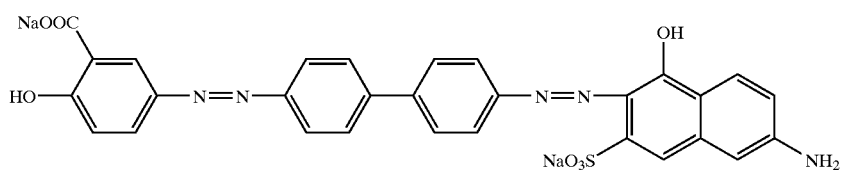
C. I. DirectRed33

-continued
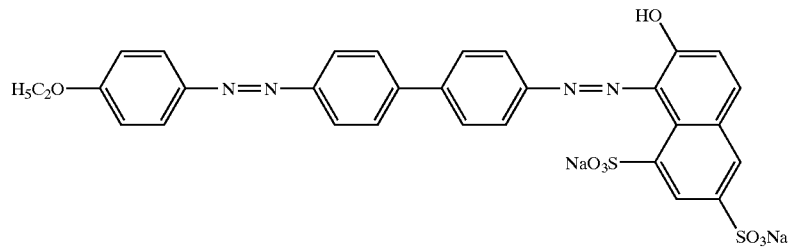
C. I. DirectRed37
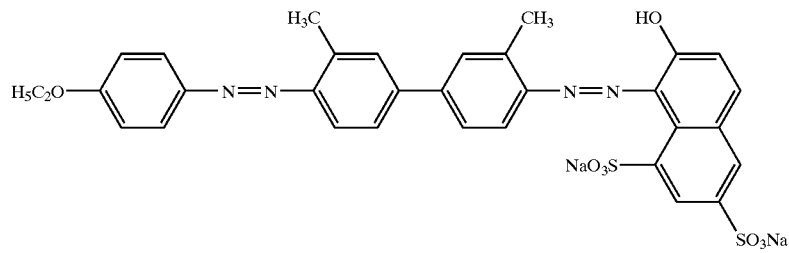
C. I. DirectRed39
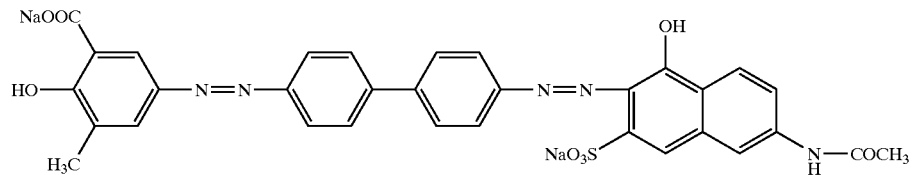
C. I. DirectRed59
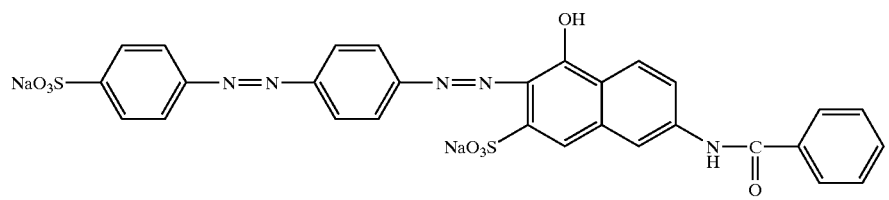
C. I. DirectRed81
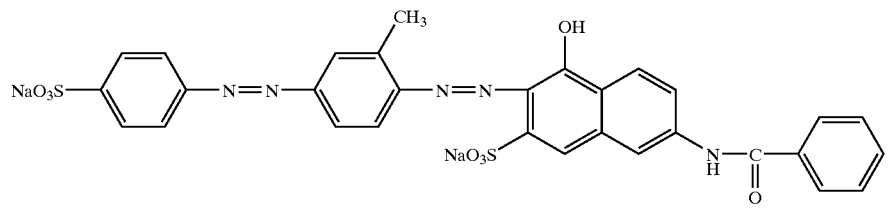
C. I. DirectRed90
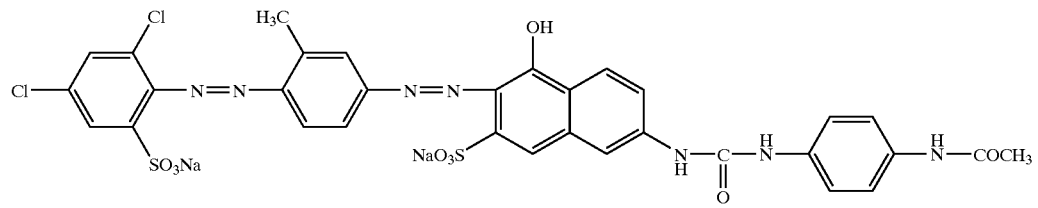
C. I. DirectRed110
Monoazo Dyes
-continued
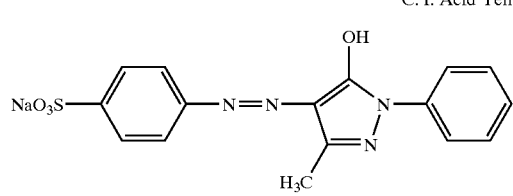
C. I. Acid Yellow-4
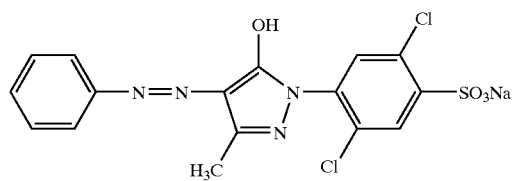
C. I. Acid Yellow 17

C. I. Acid Yellow-29
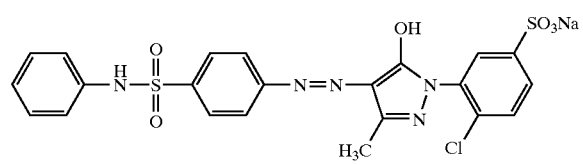
C. I. Acid Yellow-36
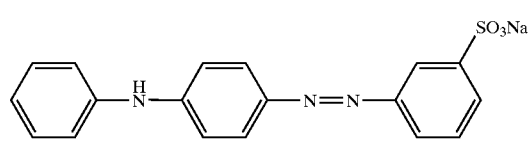
C. I. Direct Yellow-27
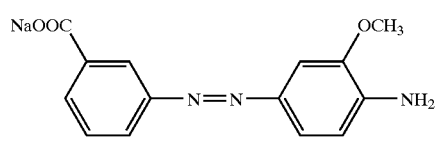
C. I. Acid Yellow-99
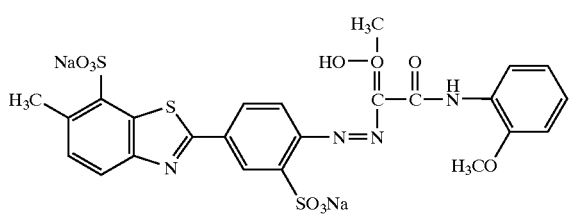
C. I. Direct Yellow-157
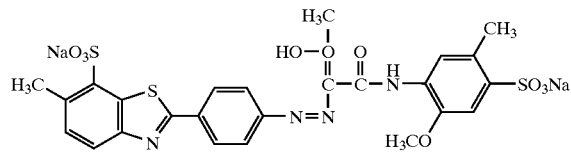
C. I. Food Yellow-3
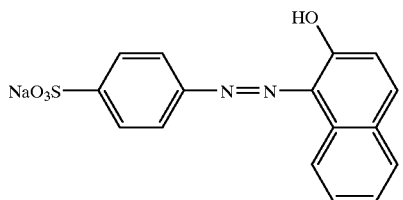
C. I. Mordant Yellow-10
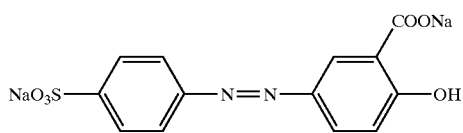
C. I. Mordant Yellow-18
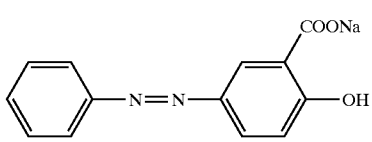
C. I. Mordant Yellow-57
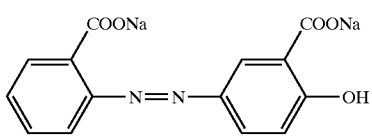
Disazo Dyes
C.I. Acid Yellow-38
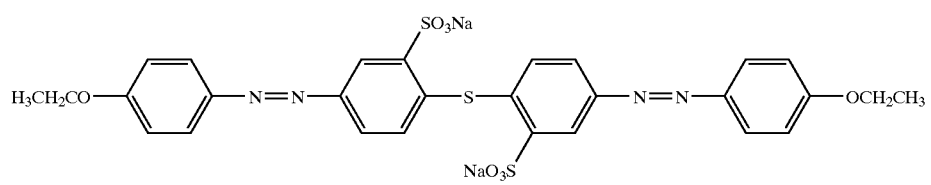
C. I. Acid Yellow-42
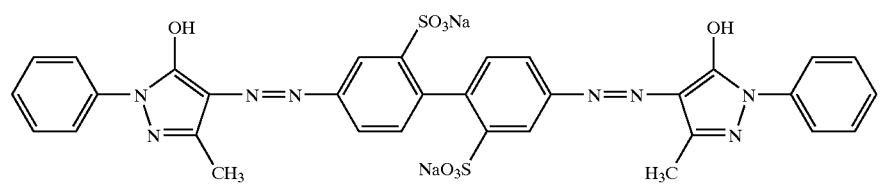

C. I. Acid Yellow-44
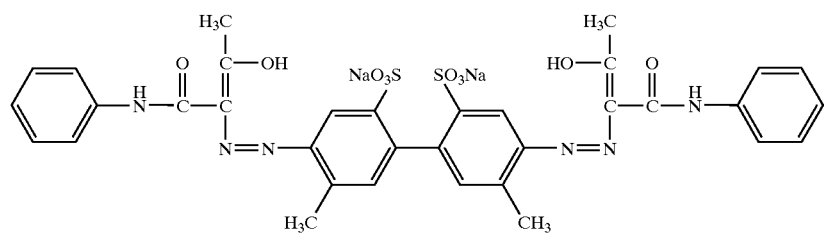
C. I. Direct Yellow-4
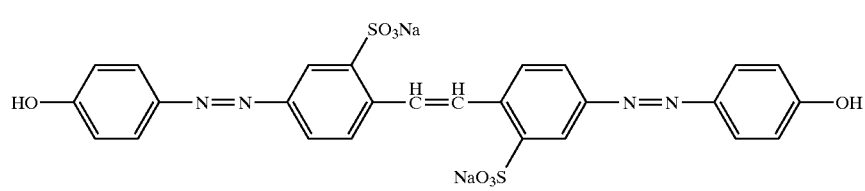
C. I. Direct Yellow-12
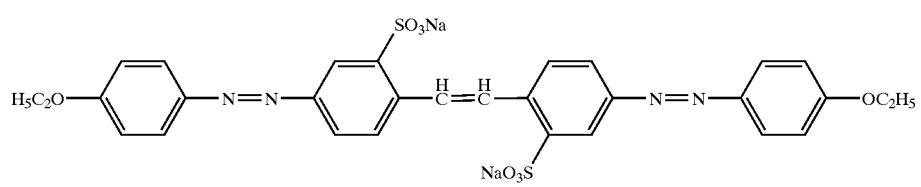
C. I. Direct Yellow-132
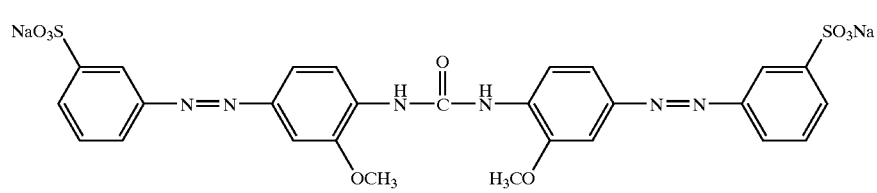
Nitro Dyes
C. I. Acid Yellow-1
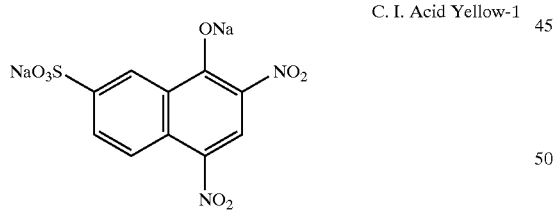
-continued
C. I. Mordant Yellow-23
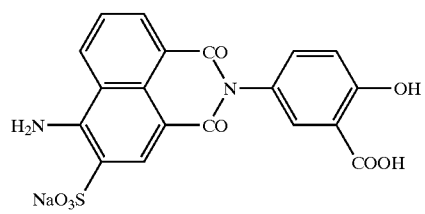
Aminoketone Dyes
C. I. Acid Yellow-7
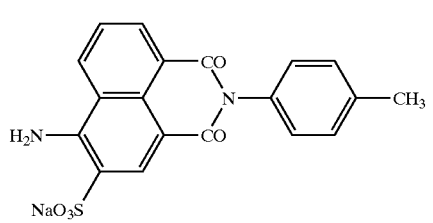
Xanthene Dyes
C. I. Acid Yellow-73
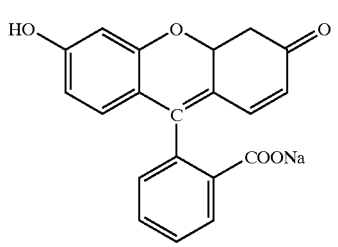

C. I. Acid Yellow-74

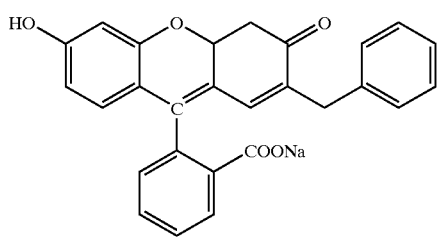

Quinoline Dyes

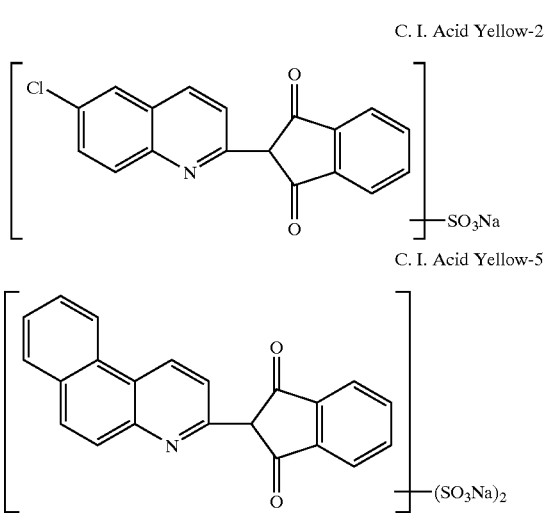

The molecular weight of the dyes for use in the present invention is not particularly limited, but from the viewpoints of the adsorption to the pigments, dispersibility and others, is usually 200 or more, preferably 250 or more, and usually 1500 or less, preferably 1000 or less.

Commercially available pigments and dyes usually contain various impurities, so that when they are used as they are, the presence of such impurities often causes the impairing of the characteristics of the recording liquid, for instance, by causing improper printing with the lowering of the ejection of the recording liquid when printing is conducted by an ink-jet printer, and having adverse effects on the storage stability of the recording liquid and others. Therefore, it is desirable that such impurities are removed from the pigments and dyes by preliminary purification before use in the ink-jet recording liquid of the present invention. As these impurities contained in the pigments and the dyes, there can be given, for example, reaction reagents and catalysts used in the production processes thereof, materials eluted from the apparatus and the like, and other materials. These include various metal components such as Ca, Mg, Zn, Fe, Cu, Al and Si. As a method for removing these impurities, there can be employed conventional methods which are used as a purification method for pigments and dyes. For example, there can be given removal of metallic ions by use of an ion exchange resin or the like, removal of inorganic ions by use of a reverse osmosis membrane method or the like, removal of insoluble components by use of a membrane filter filtration or the like, and removal of organic impurities by crystallization or the like. These purification methods are usually used in combination. After the purification, the content of the impurities in the pigment and the dye, for instance, the content of metallic ions in each of the pigment and the dye, is normally reduced to about 100 ppm.

The total amount of the pigment and dye in the ink-jet recording liquid in the present invention is usually 0.1% or more, preferably 0.3% or more, more preferably 0.5% or more, by weight ratio, of the total weight of the ink-jet recording liquid. When the total amount of the pigment and dye is excessive, there may be a case where a problem is caused in the dispersion stability, so that the total amount thereof is normally 15% or less, preferably 10% or less.

With respect to the ratio of the total amount of the dye to the pigment, when the amount of the dye to the pigment is too less, the pigment agglomerates and the dispersion stability is considerably lowered, so that the amount of the dye to 100 parts by weight of the pigment is 2 parts by weight or more, preferably 3 parts by weight or more, more preferably 4 parts by weight or more, furthermore preferably 5 parts by weight or more, particularly preferably 6 parts by weight or more. However, when the amount of the dye is excessive, the fastness of a printed material derived from the dye is significantly lowered, and the dispersion stability of the pigment dispersion tends to be lowered, so that the use of an excessive amount of the dye is not preferable. Therefore, the amount of the dye to the pigment is usually 100 parts by weight or less, preferably 50 parts by weight or less, more preferably 33 parts by weight or less.

On the other hand, as mentioned above, there is a limit to the adsorption of the dye on the pigment, so that even if the concentration of the dye is increased relative to the pigment with a certain concentration, the adsorption of the dye on the pigment becomes constant. Therefore, the amount of the dye to be used relative to the amount of the pigment also depends on the saturated adsorption, so that when a minimum amount of the dye to be used, which gives the saturated adsorption to the pigment with a particular concentration, is defined as "saturated dye adsorption", the amount of the dye to be added is preferably set so as to be in the range of $1/10$ times or more, preferably $1/3$ times or more, 20 times or less, preferably 10 times or less, more preferably 5 times or less, the saturated dye adsorption. When the amount of the dye is less than this, the dispersion stability of the pigment is considerably lowered, while when the amount of the dye is more than this, the possibility that the dye that is not adsorbed on the pigment (hereinafter this dye is referred to as "free dye") will cause the flocculation of the pigment is increased and therefore the use of the dye in such an amount is not preferable.

(Surfactants)

In the present invention, the ink-jet recording liquid with excellent dispersibility, and excellent printing performance and storage stability, can be obtained by using a pigment, a dye with a particular adsorptivity onto the pigment, and both a nonionic surfactant and an anionic surfactant in combination.

In the present invention, by use of a nonionic surfactant and an anionic surfactant in combination, an ink-jet recording liquid with excellent dispersibility and storage stability can be obtained. However, the details as to why such excellent effects can be obtained have not necessarily been clarified. However, the liquid property of the ink-jet recording liquid is usually alkaline to neutral, and by use of an aqueous medium prepared by mixing water with a water-soluble organic solvent, the liquid property is adjusted to as to enhance the wettability of coloring materials to paper and the penetration thereof into paper, and to increase the moisture retention property of the surface of a printer head nozzle, and to maintain the start-up performance of the printer. In the present invention, the use of an anionic surfactant and a nonionic surfactant in combination is considered to contribute synergistically to the dissociation in the aqueous medium and to the securing of the affinity for water and the dispersibility therein, and also to the securing of the affinity for organic solvents and dispersibility therein The anionic surfactants for use in the present invention are not particularly limited, but there can be employed, for example, fatty acid salts, alkylsulfates, alkylbenzenesulfonates, alkylnaphthalenesulfonates, alkylsulfosuccinates, alkyldiphenyl ether sulfonates, alkylphosphates, polyoxyethylene alkylsulfates, polyoxyethylene alkylarylsulfates, alkanesulfonates, naphthalenesulfonic acid formalin condensates, polyoxyethelene alkyl phosphates and α-olefin sulfonates. Specifically, there can be given, for example, polyoxyethelene stearyl sulfonate, dodecyl sulfonate and dodecylbenzene sulfonate.

Of these anionic surfactants, for example, alkylsulfates, polyoxyethylene alkylsulfates, polyoxyethylene alkylarylsulfates and alkylbenzenesulfonates are preferable.

The nonionic surfactants are not particularly limited, but there can be given polyoxyethylene alkyl ethers, polyoxyethylene alkylaryl ethers, polyoxyethylene alkylphenyl ethers, polyoxyethylene derivatives, sorbitan fatty acid esters, polyoxyethylene sorbitan fatty acid esters, polyoxyethylene sorbitol fatty acid esters, glycerin fatty acid esters, polyoxyethylene fatty acid esters and polyoxyethylene alkylamines.

Of these nonionic surfactants, for example, polyoxyethylene alkyl ethers, polyoxyethylene alkylphenyl ethers and polyoxyethylene alkylaryl ethers are preferable.

The above-mentioned nonionic surfactants and anionic surfactants usually have a molecular weight of about 2000 or less, preferably about 1500 or less. In case the molecular weight is excessively high, the liquid viscosity of the ink-jet recording liquid, when using such surfactants, is increased and therefore the lowering of the ejection performance thereof is apt to take place when ink-jet recording is performed.

The ratio (weight ratio) of the anionic surfactant to the nonionic surfactant depends upon the liquid characteristics of the ink-jet recording liquid, but the amount of the anionic surfactant is usually in the range of 1 part by weight or more, preferably 2 parts by weight or more, more preferably 3 parts by weight or more, furthermore preferably 5 parts by weight or more, particularly preferably 10 parts by weight or more, per 100 parts by weight of the nonionic surfactant. However, when the amount of the anionic surfactant is excessive, there is the possibility that the dispersion stability is impaired, so that the amount of the anionic surfactant is usually 5 times or less, preferably 2.5 times or less the amount of the nonionic surfactant in terms of parts by weight.

The surfactants are contained in total in the range of 0.01 wt % or more, preferably 0.1 wt % or more, more preferably 0.2 wt % or more, and 5 wt % or less, preferably 3 wt % or less, more preferably 2 wt % or less in the total weight of the recording liquid.

In the ink-jet recording liquid of the present invention, as long as the pigment, the dye and the surfactants to be used are maintained in the state where the dye is adsorbed onto the pigment as mentioned above and the anionic surfactant and the nonionic surfactant coexist, whereby the effects of the present invention such as the dispersion stability and storage stability are obtained, if the case requires, the ink-jet recording liquid may contain pigments, dyes and surfactants other than the above-mentioned pigments, dyes and surfactants. Even in such a case, it is preferable that the pigment, the dye and the surfactants which produce the above-mentioned state be contained as the main component of each of them in the recording liquid of the present invention, more preferably in an amount of 70% or more, particularly preferably in an amount of 80% or more with respect to each component.

(Process for Producing the Ink-jet Recording Liquid)

Next, a process for producing the ink-jet recording liquid of the present invention will be explained.

The ink-jet recording liquid of the present invention can be obtained by mixing a pigment, a dye and/or a dye aqueous medium solution, and an aqueous medium, subjecting the pigment and the dye to a primary dispersing process to obtain a dispersion, adding to the obtained dispersion a nonionic surfactant and an anionic surfactant, and/or an aqueous medium solution of these surfactants, to perform a secondary dispersing process and can be advantageously obtained easily and industrially.

Specifically, according to the present invention, first of all, the pigment and the dye are dispersed in an aqueous medium (primary dispersing process), and then subjected to a further dispersing process by use of the surfactants (secondary dispersing process), whereby the dye is adsorbed on the surface of the pigment in a stable manner to obtain the effect of dispersing the pigment by the dye. Furthermore, part of the dye is replaced by a surfactant having a suitable liquid property for the recording liquid, whereby a secondary agglomeration of the dispersion in the recording liquid can be controlled, so that a recording liquid with excellent dispersibility and storage stability can be produced.

In the process according to the present invention, the pigment, the dye and/or the dye aqueous medium solution, and the aqueous medium are mixed to carry out the primary dispersing process, whereby a dispersion in which a dye-adsorbed pigment is dispersed is obtained.

The total amount of the pigment and the dye in the pigment/dye dispersion is usually 1 to 30%, preferably 3 to 20% in terms of weight ratio to the entire dispersion. When the total amount is less than 1%, the concentration is apt to become insufficient when the dispersion is used as the recording liquid, while when the total amount exceeds 30%, the dispersion stability is apt to be lowered and such an amount is not preferable.

As a mill used for carrying out the dispersing process, various kinds of mills which are usually used for dispersing pigments can be properly used. The mills are not particularly limited. There can be used, for example, paint shaker, ball mill, sand mill, attritor, pearl mill, Co-ball mill, homomixer, homogenizer, wet type jet mill and ultrasonic homogenizer. When media is used in the mill, glass beads, zirconia beads, alumina beads, magnetic beads, and styrene beads can be used. Of these, a preferable prescription for the dispersing process is a method of performing dispersion using beads as media in a mill and then performing dispersion in an ultrasonic homogenizer.

There is no particular limitation to a method for obtaining a pigment/dye dispersion with preferable particle diameters. However, for obtaining a pigment/dye dispersion with preferable particle sizes, there can be employed various methods or techniques thereof in combination, such as reducing the size of dispersion media used in the mill, increasing the packing ratio of the dispersion media, increasing the concentration of the pigment in the dispersion, lengthening the time for the dispersing process, classifying the dispersion by a filter or a centrifugal separator or the like after the dispersing.

There is nothing provided in particular, but in case unfavorable phenomena occur such as the increasing of the viscosity of the dispersion or the foaming of the dispersion caused by the heat generated at the time of dispersing, it is desirable to carry out the dispersing process as cooling is being performed.

A dispersion is formed by adding the above-mentioned anionic surfactant and nonionic surfactant, and/or an aqueous medium solution of these surfactants to the thus prepared pigment/dye dispersion as it is, or the pigment/dye dispersion diluted with deionized water or pure water, to prepare a mixed liquid, and subjecting the mixed liquid to the secondary dispersing process.

When the dye is adsorbed on the pigment after a surfactant or a polymeric dispersant has been adsorbed on the pigment, or when the surfactant or the polymeric dispersant and the dye are simultaneously adsorbed on the pigment to subject the same to the dispersing process, as is conventionally done, the adsorption of the dye is lowered in comparison with the dispersion prepared by the above-mentioned process of the present invention, and the particle diameters are increased and the dispersion stability is lowered in comparison with the above-mentioned dispersion, so that the conventional method is not preferable. The reasons for this has not yet been clarified, but it is considered that when the pigment and the surfactant are mixed first, the surfactant is first adsorbed on the pigment, so that the adsorption on the pigment of the dye which is added later is hindered and therefore a sufficient dispersing effect does not develop.

Further, before the surfactant is dispersed in the pigment/dye dispersion, a water-soluble organic solvent may be added to the pigment/dye dispersion. The water-soluble organic solvent is not particularly limited, but there can be given, for example, ethylene glycol, diethylene glycol and ethanol. As the mill for use in such dispersing process, for example, ball mill, sand mill, attritor, pearl mill, Co-ball mill, homomixer, homogenizer, magnetic stirrer and ultrasonic homogenizer can be used, although the mills are not limited thereto. In mills using media, glass beads, zirconia beads, alumina beads, magnetic beads and styrene beads can be used.

The ink-jet recording liquid of the present invention comprises the above obtained dispersion, the aqueous medium and other various kinds of additives to be added if necessary.

The ink-jet recording liquid, namely the ink, can be prepared by use of the above prepared pigment dispersion as it is, which comprises the pigment, the dye, the surfactants and the aqueous medium, or by diluting the pigment dispersion with water and then mixing the diluted pigment dispersion with a water-soluble organic solvent, with other additives being mixed therewith. The mixing of the ink can be carried out, for instance, by use of a magnetic stirrer or a stirrer provided with conventional blades, or by use of a high-speed mill, an ultrasonic mill, a homogenizer or the like, although the mixing is not limited thereto.

A suitable aqueous medium for use in the ink-jet recording liquid of the present invention is a mixed solvent of water and a water-soluble organic solvent. As the water to be used here, it is desirable to use deionized water or pure water in the same manner as in the medium for the dispersion, not water in general use which contains various ions.

Examples of the water-soluble organic solvent used in the present invention are polyhydric alcohols such as ethylene glycol, diethylene glycol, propylene glycol, butylene glycol, triethylene glycol, tetraethylene glycol, trimethylolpropane, 1,5-pentanediol, 1,2,6-hexatriol and glycerin; polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, propylene glycol monobutyl ether and dipropylene glycol monobutyl ether; nitrogen-containing solvents such as pyrrolidone, N-methyl-2-pyrrolidone, cyclohexylpyrrolidone, monoethanolamine, diethanolamine, and triethanolamine; alcohols such as ethanol, isopropyl alcohol, butyl alcohol and benzyl alcohol; sulfur-containing solvents such as thiodiethanol, thiodiglycerol, sulfolane and dimethyl sulfoxide; propylene carbonate, and ethylene carbonate, although the water-soluble organic solvent is not limited to these.

The content of the above-mentioned water in the recording liquid is usually in the range of 30 wt % or more, preferably 50 wt % or more, and usually in the range of 95 wt % or less, preferably 90 wt % or less.

The content of the above-mentioned water-soluble organic solvent, although there is no particular limit thereto, is usually in the range of 0.1 wt % or more, preferably 1 wt % or more, more preferably 5 wt % or more, and usually in the range of 60 wt % or less, preferably 40 wt % or less, particularly preferably 30 wt % or less.

In particular, with respect to the use ratio of the above-mentioned water to the water-soluble organic solvent, it is preferable that the amount of the water used be the same as or more than that of the water-soluble organic solvent, and 19 or less times the amount of the water-soluble organic solvent in terms of parts by weight.

As the additives, any appropriate additives can be usually selectively used from various kinds of additives used for the preparation of ink-jet recording liquid, when necessary, in such a range that does not impair the stability of the dispersion. Examples of such additives are surface-tension adjustor, pH adjustor, antiseptic agent, chelating agent, water-dispersible resin, conductivity adjustor and anti-foaming agent, but are not particularly limited to these. The following are specific examples of the additives.

The surface-tension adjustor is mainly used for adjusting the penetrating effect of the recording liquid into paper, and as such a surface-tension adjustor, anionic, cationic and nonionic surfactants are employed, and polymeric surfactants are also employed.

As the anionic surfactant, there can be employed, for example, fatty acid salts, alkylsulfates, alkylbenzenesulfonates, alkylnaphthalenesulfonates, alkylsulfosuccinates, alkyldiphenyl ether sulfonates, alkylphosphates, polyoxyethylene alkylsulfates, polyoxyethylene alkylarylsulfates, alkanesulfonates, naphthalenesulfonic acid formalin condensates, polyoxyethelene alkyl phosphates and α-olefin sulfates, although the anionic surfactant is not particularly limited to these.

As the nonionic surfactants, there can be given, for example, polyoxyethylene alkyl ethers, polyoxyethylene alkylaryl ethers, polyoxyethylene alkylphenyl ethers, polyoxyethylene derivatives, sorbitan fatty acid esters, polyoxyethylene sorbitan fatty acid esters, polyoxyethylene sorbitol fatty acid esters, glycerin fatty acid esters, polyoxyethylene fatty acid esters and polyoxyethylene alkylamines, although the nonionic surfactant is not particularly limited to these.

As the cationic surfactants, there can be given, for example, tetraalkylammonium salts, alkylamine salts, benzalkonium salts, alkylpyridinium salts and imidazolium salts, although the cationic surfactant is not particularly limited to these.

Furthermore, there can be employed silicone type surfactants such as polysiloxane oxyethylene adduct, fluorine type surfactants such as perfluoroalkylcarboxylate, perfluoroalkylsulfonate and oxyethyleneperfluoroalkyl ether, and biosurfactants such as rhamnolipid, and lysolecithin.

In the present invention, of the above-mentioned surfactants, it is preferable to use the same kind of surfactant as that of the surfactant used in preparing the dispersion in view of the dispersion stability. Specifically, it is preferable to use a surfactant selected from the group consisting of the anionic surfactants and the nonionic surfactants. In particular, it is more preferable to use surfactants with a similar or the same structure.

The amount of such surfactants added is in total from 0 to 5 wt %, preferably from 0 to 3 wt %, more preferably from 0 to 2 wt %, in the recording liquid.

A mildewproofing agent is added to prevent mildew and germs from growing in the recording liquid. There is no particular limit to the mildewproofing agent. As the mildewproofing, for example, sodium dehydroacetate and sodium benzoate can be used. These are preferably contained in the recording liquid in an amount ranging from 0.05 to 1.0 wt %.

The chelating agent is used to hinder metals in the recording liquid and to prevent metals from depositing in the nozzle. As the chelating agent, there is no particular limitation to it, but, for example, sodium salt of ethylenediaminetetraacetic acid, and diammonium salt of ethylenediamineteraacetic acid can be used. These are used in the recording liquid in an amount ranging from 0.005 to 0.5 wt %.

In order to adjust pH of the recording liquid, to stabilize the recording liquid, or to obtain stability with the piping for the recording liquid in the recording apparatus, there can be employed a pH adjustor such as sodium hydroxide, nitric acid and ammonia, and a buffer such as phosphate. Usually, pH of the recording liquid is adjusted to the range of from about 6 to about 11.

Furthermore, in order to prevent the formation of foams in the recording liquid, an antifoamer can be added thereto.

To the ink-jet recording liquid of the present invention, a water-dispersing resin can be used within such a range that the use thereof does not impair the effects of the present invention, in order to enhance the fixing performance of the recording liquid to paper, and the water resistance of an ink coated film. As the water-dispersing resin, there is no particular limitation thereto, but there can be given, for example, a polyester resin, a polyamide resin, a polyurethane resin, an epoxy resin, a butadiene resin, a petroleum resin, a fluororesin, polyamino acid, dextrin, pectin, arginine, glycogen, chitin, polynucleic acid, carboxymethyl cellulose, carboxylmethyl dextran, and water-soluble vinyl resins such as an acrylic resin, a styrene-acrylic resin, a polyvinyl alcohol resin, a vinyl acetate resin, a polyvinyl pyrrolidone resin, a polyvinyl amine resin, a polyvinyl allylamine resin, a polylvinyl pyridine resin, a polyvinyl diallyl dimethylammonium chloride resin.

The water-dispersible resin is used in the recording liquid, usually in an amount ranging from 0.1 to 10 wt %, preferably in an amount ranging from 0.5 to 5 wt %.

EXAMPLES

The present invention will now be explained in further detail with reference to Examples. The present invention is not limited by the following Examples as long as the present invention does not exceed the gist thereof.

Furthermore, in Examples and Comparative Examples, % is on the basis of weight unless otherwise provided. The measurement of the particle diameter of the pigment dispersions, and the evaluation of the storage stability thereof and the adsorption of the dyes to the pigments in Examples and Comparative Examples were carried out by the following methods.

From each of the dyes to be used in the following Examples and Comparative Examples, prior to the use thereof, insoluble components such as inorganic salts and metal salts were removed by membrane filter filtration or the like, and organic impurities were removed by crystallization, so that the content of each of metal ions of Ca, Mg, Zn, Fe, Cu and Al was made 100 ppm or less. Thus, the dyes with the reduced content of impurities were used.

(1) Particle Diameter

The ink-jet recording liquid was diluted 10000 times with deionized water, and the particle diameters were measured with He—Ne laser by use of DLS7000 (Otsuka Electronics Co., Ltd.), and the value of the mean particle diameter was calculated by Cumulant method.

(2) Storage Stability

The ink-jet recording liquid was allowed to stand still in a constant temperature chamber at 23° C., relative humidity 50%, for one week, and the particle diameters of the ink-jet recording liquid taken out from a lower portion of a container thereof and were compared with the particle diameters of the ink-jet recording liquid immediately after the preparation thereof, whereby the storage stability was evaluated.

(3) Dye Adsorption

The measurement of the dye adsorption was carried out by the following method. Specifically, at 23° C., 4.1 g of the pigment in terms of solid content (the amount of the pigment in the dispersion) and 0.4 g of the dye in terms of solid content (the total amount of the dye in the dispersion) were weighed, and water was added thereto to make the total weight thereof 50 g. The mixture was subjected to dispersing process together with 75 g of 0.5 mmφ zirconia beads in a paint shaker (Paint Shaker PC made by Asada Iron Works, Co., Ltd., number of frequency 535 rpm (50 Hz)) for 6 hours, whereby a dispersion was obtained. The obtained dispersion was subjected to centrifugation processing at room temperature in Inverter Micro Centrifuge 1120 (made by Kubota Corporation) at 14000 rpm (centrifugal force: 17968×g) for 3 hours, whereby a supernatant liquid was obtained.

The above-mentioned supernatant liquid, and a dye aqueous solution with the same concentration as that of the total dye in the above-mentioned dispersion, that is, a 0.87 wt % dye aqueous solution (hereinafter abbreviated to the dye aqueous solution), were subjected to measurement under the following conditions by use of a HPLC apparatus (Detector: L-7420 type, Pump: L-7110 type) to determine the dye adsorption ratio and the dye adsorption, based on the obtained HLPC peak area derived from the dye according to the following formula.

[Measurement Conditions for HPLC]

| | |
|---|---|
| Detection wavelength | 245 nm |
| Column | Inertsil-ODS 5µ (4.6 mmφ × 250 mmL) (GL Sciences, Inc.) |
| Column temperature | 40° C. |
| Eluate | acetonitrile water (the concentration of acetonitrile is so adjusted that a main peak can be detected within a 60-minute measurement time) |

-continued

| | |
|---|---|
| Buffer | tetrabutylammonium bromide; 1.0 wt %/H$_2$O sodium dihydrogenphosphate; 0.25 wt %/H$_2$O |
| Flow rate | 1.0 ml/min |
| Injection amount | 2.0 μl (undiluted) |
| Chromato pack | CR-6A (Shimadzu Corporation) |

$$\text{Dye adsorption ratio} = 1 - \frac{HPLC \text{ peak area of supernatant liquid}}{HPLC \text{ peak area of 0.87 wt \% dye aqueous solution}} \quad \text{(II)}$$

$$\text{Dye adsorption (g/g)} = \frac{\text{Dye absorption ratio of the dispersion} \times \text{Total amount of the dye in the dispersion } (=0.4 \text{ g})}{\text{Amount of the pigment in the dispersion } (=4.1 \text{ g})} \quad \text{(I)}$$

(4) Printing Test

Examples 1 to 4 and Comparative Examples 1 to 4

With respect to Examples 1 to 4 and Comparative Examples 1 to 4, an ink was loaded in a cartridge for black color, and printing was conducted on plain paper (Xerox Corporation XX4024) by use of DeskJet 990Cxi Printer (made by Hewlett-Packard Development Company) and BJ-F870 Printer (made by Canon Inc.), whereby the printing capability was evaluated.

Evaluation

O: almost no unprinted scratches

X: illegible due to heavy unprinted scratches

With respect to Examples 1 to 4, the ink was kept loaded in the cartridge for one week and then the printing capability thereof was evaluated.

Evaluations

O: printing is possible even after one week

X: printing is impossible after one week

Examples 5 to 8 and Comparative Examples 5 to 9

With respect to Examples 5 to 8 and Comparative Examples 5 to 9, an ink was loaded in a cartridge for black color, and printing was conducted on plain paper (Xerox Corporation XX4024) by use of DeskJet 990Cxi Printer (made by Hewlett-Packard Development Company). The ink was kept loaded in the cartridge for one week and then the printing capability thereof was evaluated.

Evaluation

O: printing is possible even after one week

X: printing is impossible after one week

Example 1

13.8 g of quinacridone red pigment PR-122 (Dainichiseika Kogyo Co., Ltd.; ECR-187; paste; solid content 29.7%), 4 g of a 10% aqueous solution of xanthene dye AR-51 (C.I. Acid Red 51: Aldrich Co.), and 32.2 g of deionized water were mixed and were then dispersed together with 0.5 mmφ zirconia beads serving as media in a paint shaker (Asada Iron Works, Co.: Paint Shaker PC, number of frequency 535 rpm (50 Hz)) for 6 hours, whereby a dispersion was obtained. The dye adsorption of the obtained dispersion was 0.07 g/g.

40.9 g of the above-mentioned RP-122, 13.5 g of the above-mentioned 10% aqueous solution of AR-51, and 95.6 g of deionized water were weighed and placed in a 200 ml beaker. The beaker was put into iced water and the mixture therein was dispersed in an ultrasonic homogenizer (Nihonseiki Seisakusho Ltd.; US-300T; employed tips 26 mmφ)for 3 minutes. After the temperature of the liquid was elevated to 20° C., the 3-minute dispersing was repeated until the total dispersing time amounted to 60 minutes, whereby a dispersion (a) was obtained.

Immediately after the preparation of the dispersion (a), to 7.4 g of the dispersion (a) were added 0.1 g of nonionic surfactant Brij76 (polyoxyethylene (10) stearyl ether (molecular weight=711.04); Aldrich Co.) and 0.1 g of anionic surfactant SDS (dodecyl sodium sulfate (molecular weight=288.38); Wako Pure Chemical Industries, Ltd.), and the mixture was stirred by a magnetic stirrer (1000 rpm) for 15 minutes and subjected to ultrasonic dispersing process for 15 minutes, whereby a dispersion (b) was obtained.

The obtained dispersion (b) was made an ink with the following formulation.

(Preparation of the Ink)

| | |
|---|---|
| Dispersion (b) | 7.6 g |
| Deionized water | 4.6 g |
| Triethylene glycol monobutyl ether | 2.0 g |
| Diethylene glycol | 1.8 g |
| Glycerol | 2.0 g |
| Triethanolamine | 0.2 g |
| Urea | 1.8 g |

The above components were mixed and stirred by a magnetic stirrer (1000 rpm) for 15 minutes, and subjected to ultrasonic dispersing process for 15 minutes. The pH of the mixture was then adjusted to 9.6 with an aqueous solution of NaOH, whereby an ink was obtained. The results of the evaluation of the ink are shown in Table 1 and Table 2.

Example 2

By use of the dispersion (a) in Example 1, a dispersion (c) was obtained in the same manner as in Example 1 except that the nonionic surfactant in the dispersion (b) was replaced by Brij78 (polyoxyethylene (20) stearyl ether (Mw=1151.57); Aldrich Co.).

By use of the obtained dispersion (c), an ink was obtained by using the same additives and the same preparation method as in Example 1. The results of the evaluation of the ink are shown in Table 1 and Table 2.

Example 3

4.1 g of quinacridone red pigment PR-122 (Dainichiseika Kogyo Co., Ltd.; ECR-184), 4 g of a 10% aqueous solution of anthraquinone dye AV-43 (C.I. Acid Violet 43: Tokyo Kasei Kogyo Co., Ltd.), and 41.9 g of deionized water were mixed and were then dispersed together with 0.5 mmφ zirconia beads serving as media in a paint shaker (Asada Iron Works, Co.: Paint Shaker PC, number of frequency 535 rpm (50 Hz)) for 6 hours, whereby a dispersion (d) was obtained. The dye adsorption of the obtained dispersion (d) was 0.06 g/g.

In the combination of the above-mentioned PR-122 and the above-mentioned AV-43, a dispersion was obtained by the same preparation method as that for the dispersion (a) in Example 1. Immediately after the preparation of the dispersion, by use of the dispersion, a dispersion was obtained by use of the same surfactants and the same preparation method as in the dispersion (b) in Example 1. By use of this dispersion, an ink was obtained by use of the same additives and the same preparation method as in Example 1. The results of the evaluation of the ink are shown in Table 1 and Table 2.

Example 4

4.1 g of PR-122 (Dainichiseika Kogyo Co., Ltd.; ECR-184), 4 g of a 10% aqueous solution of xanthene dye AR-87 (C.I. Acid Red 87: Tokyo Kasei Kogyo Co., Ltd.), and 41.9 g of deionized water were mixed and were then dispersed together with 0.5 mmφ zirconia beads serving as media in a paint shaker (Asada Iron Works, Co.: Paint Shaker PC, number of frequency 535 rpm (50 Hz)) for 6 hours. The dye adsorption of the obtained dispersion (e) was 0.04 g/g.

In the combination of the above-mentioned PR-122 and the above-mentioned AR-87, a dispersion was obtained by the same preparation method as that for the dispersion (a) in Example 1. Immediately after the preparation of the dispersion, by use of this dispersion, a dispersion was obtained by use of the same surfactants and the same preparation method as in the dispersion (b) in Example 1. By use of this dispersion, an ink was obtained by use of the same additives and the same preparation method as in Example 1.

Comparative Example 1

By use of the dispersion (a) in Example 1, a dispersion (f) was obtained by the same preparation method as in Example 1 except that the surfactants in the dispersion (b) were entirely replaced by nonionic surfactant Brij76.

By use of the obtained dispersion (f), an ink was obtained by use of the same additives and the same preparation method as in Example 1. The results of the evaluation of the ink are shown in Table 1 and Table 2.

Comparative Example 2

By use of the dispersion (a) in Example 1, a dispersion (g) was obtained by the same preparation method as in Example 1 except that the surfactants in the dispersion (b) were entirely replaced by anionic surfactant SDS.

By use of the obtained dispersion (g), an ink was obtained by using the same additives and the same preparation method as in Example 1. The results of the evaluation of the ink are shown in Table 1 and Table 2.

Comparative Example 3

4.1 g of PR-122 (Dainichiseika Kogyo Co., Ltd.; ECR-184), 4 g of a 10% aqueous solution of monoazo dye AR-8 (C.I. Acid Red 8: Sumitomo Chemical Co., Ltd.), and 41.9 g of deionized water were mixed and were then dispersed together with 0.5 mmφ zirconia beads serving as media in a paint shaker (Asada Iron Works, Co.: Paint Shaker PC, number of frequency 535 rpm (50 Hz)) for 6 hours, whereby a dispersion (h) was obtained. The dye adsorption of the obtained dispersion (h) was 0.01 g/g.

Immediately after the preparation of the dispersion (h), by use of the dispersion (h), a dispersion (i) was obtained by using the same surfactants and the same preparation method as for the dispersion (b) in Example 1. By use of the obtained dispersion (i), an ink was obtained by using the same additives and the same preparation method as in Example 1. The results of the evaluation of the ink are shown in Table 1 and Table 2. The results indicate that the differences in molecular skeleton structure between the pigment and the dye reduced the dye adsorption and made the physical adsorption thereof inferior.

Comparative Example 4

4.1 g of PR-122 (Dainichiseika Kogyo Co., Ltd.; ECR-184), 4 g of a 10% aqueous solution of the red dye (with the following formula 1) described in Example 1 of JP-A-8-218019, and 41.9 g of deionized water were mixed and were then dispersed together with 0.5 mmφ zirconia beads serving as media in a paint shaker (Asada Iron Works, Co.: Paint Shaker PC, number of frequency 535 rpm (50 Hz)) for 6 hours, whereby a dispersion(j) was obtained. The dye adsorption of the obtained dispersion(j) was 0.01 g/g.

Immediately after the preparation of the dispersion (j), by use of the dispersion (j), a dispersion (k) was obtained by using the same surfactants and the same preparation method as for the dispersion (b) in Example 1. By use of the obtained dispersion (k), an ink was obtained by using the same additives and the same preparation method as in Example 1. The results of the evaluation of the ink are shown in Table 1 and Table 2.

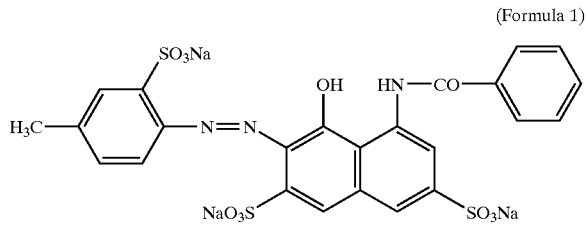

(Formula 1)

TABLE 1

Results of the evaluation of the inks

| | Number of dissociative groups ($-SO_3H$, $-COOH$) in one molecule of dye | Dye to pigment in a dispersion comprising pigment/dye/water (g/g) | Surfactant | Particle diameter of pigment in ink (nm) | Storage stability of ink (increase ratio of particle diameter of pigment) |
|---|---|---|---|---|---|
| Ex. 1 | 2(1) | 0.07 | Brij76/SDS | 153 | 1.0 times |
| Ex. 2 | 2(1) | 0.07 | Brij78/SDS | 156 | 1.0 times |
| Ex. 3 | 2(1) | 0.06 | Brij76/SDS | — | — |
| Ex. 4 | 2(1) | 0.04 | Brij76/SDS | — | — |
| Comp. Ex. 1 | 2(1) | 0.07 | Brij76/SDS | 181 | 1.2 times |
| Comp. Ex. 2 | 2(1) | 0.07 | SDS | 177 | 1.7 times |
| Comp. Ex. 3 | 3(2) | 0.01 | Brij76/SDS | 229 | 1.4 times |
| Comp. Ex. 4 | 4(3) | 0.01 | Brij76/SDS | 225 | 1.4 times |

TABLE 2

Results of printing tests

| | Immediately after preparation | | After one week | |
|---|---|---|---|---|
| | Desk Jet 990Cxi | BJ-F 870 | Desk Jet 990Cxi | BJ-F 870 |
| Example 1 | ○ | ○ | ○ | ○ |
| Example 2 | ○ | ○ | ○ | ○ |
| Example 3 | ○ | ○ | ○ | ○ |
| Example 4 | ○ | ○ | ○ | ○ |
| Comparative Example 1 | X | X | | |
| Comparative Example 2 | X | X | | |
| Comparative Example 3 | X | X | | |
| Comparative Example 4 | X | X | | |

Example 5

18.6 g of monoazo yellow pigment C.I. Pigment Yellow-74 (Dainichiseika Kogyo Co., Ltd.; paste; solid content 22.1%), 4.0 g of a 10 wt % aqueous solution of C.I. Direct Yellow-132 (Hodogaya Chemical Co., Ltd.), and 27.2 g of deionized water were mixed and were then dispersed together with 0.5 mmφ zirconia beads serving as media in a paint shaker (Asada Iron Works, Co.: Paint Shaker PC, number of frequency 535 rpm (50 Hz)) for 6 hours, whereby a dispersion (1) was obtained. The dye adsorption of the obtained dispersion was 0.05 g/g.

Immediately after the preparation of the dispersion (1), to 7.4 g of the dispersion (1) were added 0.1 g of nonionic surfactant Brij76 (polyoxyethylene (10) stearyl ether (molecular weight=711.04); Aldrich Co.) and 0.1 g of anionic surfactant SDS (dodecyl sodium sulfate (molecular weight=288.38); Wako Pure Chemical Industries, Ltd.), and the mixture was stirred by a magnetic stirrer (1000 rpm) for 15 minutes and subjected to ultrasonic dispersing process for 15 minutes, whereby a dispersion (m) was obtained.

The obtained dispersion (m) was made an ink with the following formulation.
(Preparation of the Recording Liquid)

| | |
|---|---|
| Dispersion (m) | 7.6 g |
| Deionized water | 6.4 g |
| Triethylene glycol monobutyl ether | 2.0 g |
| Diethylene glycol | 2.2 g |
| Glycerol | 1.7 g |
| Triethanolamine | 0.1 g |

The above components were mixed and stirred by a magnetic stirrer (1000 rpm) for 15 minutes, and subjected to ultrasonic dispersing process for 15 minutes. The pH of the mixture was then adjusted to 9.6 with an aqueous solution of NaOH, whereby a recording liquid was obtained. The results of the evaluation of the recording liquid are shown in Table 3 and Table 4.

Example 6

18.6 g of monoazo yellow pigment C.I. Pigment Yellow-74 (Dainichiseika Kogyo Co., Ltd.; paste; solid content 22.1%), 0.4 g of C.I. Direct Yellow-27 (Aldrich Co.; powder), and 31 g of deionized water were mixed and were then dispersed together with 0.5 mmφ zirconia beads serving as media in a paint shaker (Asada Iron Works, Co.: Paint Shaker PC, number of frequency 535 rpm (50 Hz)) for 6 hours, whereby a dispersion (n) was obtained. The dye adsorption of the obtained dispersion was 0.06 g/g.

By use of the obtained dispersion (n), a dispersion (o) was obtained by adding the same surfactants and mixing the mixture as in the dispersion (m) in Example 5.

By using the obtained dispersion (o), a recording liquid was prepared by use of the same additives and the same preparation method as in Example 1. The results of the evaluation of the obtained recording liquid are shown in Table 3 and Table 4.

Example 7

18.6 g of C.I. Pigment Yellow-74 (Dainichiseika Kogyo Co., Ltd.; paste; solid content 22.1%), 0.4 g of C.I. Acid Yellow-36 (Tokyo Kasei Kogyo Co., Ltd.; powder), and 31 g of deionized water were mixed and were then dispersed together with 0.5 mmφ zirconia beads serving as media in a paint shaker (Asada Iron Works, Co.: Paint Shaker PC, number of frequency 535 rpm (50 Hz)) for 6 hours, whereby a dispersion (p) was obtained. The dye adsorption of the obtained dispersion (p) was 0.07 g/g.

By use of the obtained dispersion (p), a dispersion (q) was obtained by adding the same surfactants and mixing the mixture as in the dispersion (m) in Example 5.

By using the obtained dispersion (q), a recording liquid was prepared by use of the same additives and the same preparation method as in Example 1. The results of the evaluation of the obtained recording liquid are shown in Table 3 and Table 4.

Example 8

18.6 g of C.I. Pigment Yellow-74 (Dainichiseika Kogyo Co., Ltd.; paste; solid content 22.1%), 4 g of a 10% aqueous solution of C.I. Acid Yellow-99 (Ciba-Geigy Corp.), and 27.4 g of deionized water were mixed and were dispersed together with 0.5 mmφ zirconia beads serving as media in a paint shaker (Asada Iron Works, Co.: Paint Shaker PC, number of frequency 535 rpm (50 Hz)) for 6 hours. The dye adsorption of the obtained dispersion (r) was 0.09 g/g.

By use of the obtained dispersion (r), a dispersion (s) was obtained by adding the same surfactants and mixing the mixture as in the dispersion (m) in Example 5.

By using the obtained dispersion (s), a recording liquid was prepared by use of the same additives and the same preparation method as in Example 1. The results of the evaluation of the obtained recording liquid are shown in Table 3 and Table 4.

Comparative Example 5

By use of the dispersion (1) in Example 5, a dispersion (t) was obtained by the same preparation method as in Example 1 except that the surfactants in the dispersion (m) in Example 1 were entirely replaced by nonionic surfactant Brij76.

By using the obtained dispersion (t), a recording liquid was prepared by use of the same additives and the same preparation method as in Example 1. The results of the evaluation of the obtained recording liquid are shown in Table 3 and Table 4.

Comparative Example 6

By use of the dispersion (1) in Example 5, a dispersion (u) was obtained by the same preparation method as in Example 1 except that the surfactants in the dispersion (m) in Example 1 were entirely replaced by anionic surfactant SDS.

By using the obtained dispersion (u), a recording liquid was prepared by use of the same additives and the same preparation method as in Example 1. The results of the evaluation of the obtained recording liquid are shown in Table 3 and Table 4.

Comparative Example 7

18.6 g of C.I. Pigment Yellow-74 (Dainichiseika Kogyo Co., Ltd.; paste; solid content 22.1%), 4 g of a 10% aqueous solution of C.I. Acid Yellow-17 (Aldrich Co.), and 27.4 g of deionized water were mixed and were then dispersed together with 0.5 mmϕ zirconia beads serving as media in a paint shaker (Asada Iron Works, Co.: Paint Shaker PC, number of frequency 535 rpm (50 Hz)) for 6 hours, whereby a dispersion (v) was obtained. The obtained dispersion (v) was so viscous that it was impossible to separate the dispersion from the zirconia beads and therefore the dispersion was difficult to recover. The dye adsorption thereof was 0.002 g/g. This result indicates that because of the differences in molecular skeleton structure between the pigment and the dye, the dye adsorption was considerably small, so that the pigment was not effectively dispersed, and that the presence of an excessive amount of the free dye could cause the flocculation of the pigment.

Comparative Example 8

18.6 g of C.I. Pigment Yellow-74 (Dainichiseika Kogyo Co., Ltd.; paste; solid content 22.1%), 4 g of a 10% aqueous solution of C.I. Direct Yellow-50 (Aldrich Co.), and 27.4 g of deionized water were mixed and were then dispersed together with 0.5 mmϕ zirconia beads serving as media in a paint shaker (Asada Iron Works, Co.: Paint Shaker PC, number of frequency 535 rpm (50 Hz)) for 6 hours, whereby a dispersion (w) was obtained. The dye adsorption of the obtained dispersion (w) was 0.01 g/g.

Immediately after the preparation of the dispersion (w), by use of the dispersion (w), a dispersion (x) was obtained by use of the same surfactants and the same preparation method as for the dispersion (m) in Example 1. By use of the dispersion (x), a recording liquid was obtained by use of the same additives and the same preparation method as in Example 5. The results of the evaluation of the recording liquid are shown in Table 3 and Table 4.

Comparative Example 9

By use of the dispersion (1) in Example 5, a dispersion (y) was obtained by the same preparation method as in Example 5 except that the surfactants in the dispersion (m) in Example 5 were entirely replaced by a polymeric dispersant polyethylene glycol (PEG) (molecular weight 2000; Sigma-Aldrich Japan Company).

By using the obtained dispersion (y), a recording liquid was prepared by use of the same additives and the same preparation method as in Example 5. The results of the evaluation of the obtained recording liquid are shown in Table 3 and Table 4.

TABLE 3

Results of the evaluation of the recording liquids

| | Number of dissociative groups ($-SO_3H$, $-COOH$) in one molecule of dye | Adsorption of dye to pigment in a dispersion comprising pigment/dye/water (g/g) | Surfactant | Particle diameter of pigment in recording liquid (nm) | Storage stability of recording liquid (increase ratio of particle diameter of pigment |
|---|---|---|---|---|---|
| Ex. 5 | 2(2) | 0.05 | Brij76/SDS | 196 | 1.0 times |
| Ex. 6 | 3(2) | 0.06 | Brij76/SDS | 202 | 1.1 times |
| Ex. 7 | 1(1) | 0.07 | Brij76/SDS | 209 | 1.1 times |
| Ex. 8 | 3(1) | 0.09 | Brij76/SDS | 206 | 1.1 times |
| Comp. Ex. 5 | 2(2) | 0.05 | Brij76 | 214 | 1.6 times |
| Comp. Ex. 6 | 2(2) | 0.05 | SDS | 210 | 1.3 times |
| Comp. Ex. 7 | 3(2) | 0.002 | — | — | — |
| Comp. Ex. 8 | 4(4) | 0.01 | Brij76/SDS | 225 | 1.4 times |
| Comp. Ex. 9 | 2(2) | 0.05 | PEG | 196 | 1.6 times |

TABLE 4

Results of printing tests

| | DeskJet990Cxi |
|---|---|
| Example 5 | ○ |
| Example 6 | ○ |
| Example 7 | ○ |
| Example 8 | ○ |
| Comparative Example 5 | X |
| Comparative Example 6 | X |
| Comparative Example 7 | X |
| Comparative Example 8 | X |
| Comparative Example 9 | X |

INDUSTRIAL APPLICABILITY

According to the present invention, by selecting a combination of a pigment and a dye with a particular adsorptivity to the pigment and using a nonionic surfactant and an anionic surfactant in combination, the dispersing process at the time of the preparation of a recording liquid can be controlled, and an ink-jet recording liquid with excellent dispersibility and excellent printing performance and storage stability can be obtained.

The entire disclosures of Japanese Patent Application No. 2001-397011 filed on Dec. 27, 2001 and Japanese Patent Application No. 2002-128454 filed on Apr. 30, 2002 including specifications, claims and summaries are incorporated herein by reference in their entireties.

What is claimed is:

1. An ink-jet recording liquid, comprising:
   an aqueous medium containing a surfactant, a pigment and a dye, wherein
   (1) at least some of the dye molecules reversibly adsorb on pigment molecules without the involvement of a chemical reaction therebetween, thereby forming pigment/adsorbed dye entities;
   (2) the dye that is reversibly adsorbed on the pigment without involving a chemical reaction comprises a dye having a dye adsorption shown by the following formula (1) of 0.02 g/g or more, $$\text{Dye adsorption (g/g)} = \frac{\text{Dye absorption ratio of the dispersion} \times \text{Total amount of the dye in the dispersion } (=0.4 \text{ g})}{\text{Amount of the pigment in the dispersion } (=4.1 \text{ g})} \quad (1)$$

wherein the dye adsorption ratio is a value that is determined by analyzing (i) a supernatant liquid obtained by removing solid components from a dispersion prepared by mixing the pigment (4.1 g) and the dye (0.4 g) in the absence of a surfactant in water, and (ii) an aqueous solution of the dye (0.4 g), by high performance liquid chromatography whereby the concentration of dye in each of (i) and (ii) is determined from the peak areas of the two chromatographs obtained and the ratio of dye concentration of(i) to (ii) is determined; and (3) the surfactant comprises a combination of a nonionic surfactant and an anionic surfactant.

2. The ink-jet recording liquid according to claim 1, wherein the pigment/adsorbed dye entities are obtained by mixing and contacting the pigment and the dye molecules with each other in the absence of a surfactant.

3. The ink-jet recording liquid according to claim 1, wherein the dye molecules of the pigment/adsorbed dye entities comprise dye molecules that have 1 to 4 dissociative groups.

4. The ink-jet recording liquid according to claim 1, wherein the dye molecules of the pigment/adsorbed dye entities comprise dye molecules that have 1 or 2 dissociative groups that are COOH and $SO_3H$ groups in free acid form.

5. The ink-jet recording liquid according to claim 1, wherein said pigment is a red pigment.

6. The ink-jet recording liquid according to claim 1, wherein said pigment is a quinacridone pigment.

7. The ink-jet recording liquid according to claim 5, wherein said dye is a red dye.

8. The ink-jot recording liquid according to claim 1, wherein said pigment is a yellow pigment.

9. The ink-jet recording liquid according to claim 1, wherein said pigment is a monoazo pigment and/or disazo pigment.

10. The ink-jet recording liquid according to claim 1, wherein said dye is a yellow dye.

11. The ink-jet recording liquid according to claim 1, wherein said pigment has a mean particle diameter of 500 nm or less.

12. The ink-jet recording liquid according to claim 1, wherein the surfactant component is such that the ratio of nonionic surfactant to anionic surfactant ranges from 1:0.01 to 1:5.

13. The ink-jet recording liquid according to claim 1, wherein each of the nonionic surfactant and the anionic surfactant has a weight average molecular weight of 2000 or less.

14. The ink-jet recording liquid according to claim 1, wherein the ink-jet recording liquid contains a total amount of pigment and a total amount of dye in a weight ratio ranging from 1:0.02 to 1:1.

15. The ink-jet recording liquid according to claim 1, wherein the ink-jet recording liquid further comprises a water-dispersible resin.

16. The ink-jet recording liquid according to claim 1, wherein the ink-jet recording liquid has a pH ranging from 6 to 11.

17. The ink-jet recording liquid according to claim 1, wherein the aqueous medium is a mixed solvent of water and a water-soluble organic solvent, and the ratio by weight of water to the water-soluble organic solvent ranges from 95:5 to 50: 50.

18. A process for producing an ink-jet recording liquid, comprising:

mixing a pigment, a dye and/or an aqueous medium solution of the dye to form a dispersion, whereby the dye reversibly adsorbs on the pigment without a chemical reaction occurring between the pigment and dye in a primary dispersion step; and adding a nonionic surfactant and an anionic surfactant to the primary dispersion to form the ink-jet recording liquid in a secondary dispersing step, whereby the dye is reversibly adsorbed on the pigment without involving a chemical reaction and has a dye adsorption shown by the following formula (1) of 0.02 g/g or more.

$$\text{Dye adsorption (g/g)} = \frac{\text{Dye absorption ratio of the dispersion} \times \text{Total amount of the dye in the dispersion } (=0.4 \text{ g})}{\text{Amount of the pigment in the dispersion } (=4.1 \text{ g})} \quad (1)$$

wherein the dye adsorption ratio is a value that is determined by analyzing (i) a supernatant liquid obtained by removing solid components from a dispersion prepared by mixing the pigment (4.1 g) and the dye (0.4 g) in the absence of a surfactant in water, and (ii) an aqueous solution of the dye (0.4 g), by high performance liquid chromatography whereby the concentration of dye in each of (i) and (ii) is determined from the peak areas of the two chromatographs obtained and the ratio of dye concentration of (i) to (ii) is determined.

19. The process for producing an ink-jet recording liquid according to claim 18, further comprising adding an additional aqueous medium and/or an additional additive to the dispersion after the secondary dispersing step.

20. The process for producing an ink-jet recording liquid according to claim 19, wherein the additional aqueous medium comprises a water-soluble organic solvent, and wherein the ratio by weight of water: the water-soluble organic solvent ranges from 95:5 to 50:50.

21. The process for producing an ink-jet recording liquid according to claim 19, wherein the additional additive is a surface tension adjustor that is selected from the group consisting of a nonionic surfactant and/or anionic surfactant.

22. The process for producing an ink-jet recording liquid according to claim 21, wherein the nonionic surfactant and/or anionic surfactant as the additional additive is at least one of the surfactant employed in the secondary tension adjustor that is selected from the group consisting of the secondary dispersing process.

* * * * *